United States Patent [19]

Schellstede et al.

[11] Patent Number: 4,639,258

[45] Date of Patent: Jan. 27, 1987

[54] SINGLE PASS MUD REJUVENATION SYSTEM AND METHOD

[75] Inventors: Herman J. Schellstede, New Iberia, La.; James F. Youngblood, Houston, Tex.

[73] Assignee: Leon E. Roy, New Iberia, La. ; a part interest

[21] Appl. No.: 541,923

[22] Filed: Oct. 14, 1983

[51] Int. Cl.⁴ .................... B01G 19/00; B01D 33/04
[52] U.S. Cl. ......................................... 55/52; 55/55; 55/190; 55/203; 175/66; 210/400; 210/406; 210/456; 210/783
[58] Field of Search ............... 175/66; 55/159, 189, 55/190, 199, 201, 203, 52, 55; 198/525, 537, 540; 29/116 R; 209/270, 272, 307, 247, 250, 254, 321; 210/768, 772, 780, 783, 784, 791, 805, 194, 196, 247, 386, 391, 393, 400, 401, 402, 406, 416.1, 456

[56] References Cited

U.S. PATENT DOCUMENTS

| | | |
|---|---|---|
| 1,800,168 | 4/1931 | Brauer et al. |
| 2,576,283 | 11/1951 | Chaney ................... 255/1.8 |
| 2,895,614 | 7/1959 | Komline ................ 210/401 |
| 3,084,987 | 4/1963 | Bounin .................. 210/73 |
| 3,464,557 | 9/1969 | Fowler .................. 210/97 |
| 3,704,787 | 12/1972 | Norton ................... 210/387 |
| 3,756,411 | 9/1973 | Kracklauer ............ 210/393 X |
| 3,849,313 | 11/1974 | Lopker ................. 210/400 |
| 3,894,323 | 7/1975 | Hamlen ................. 29/116 R |
| 3,939,077 | 2/1976 | Seibert ................. 210/401 |
| 3,963,623 | 6/1976 | Buss et al. ............ 210/401 |
| 4,038,193 | 7/1977 | van Oosten ........... 210/400 |
| 4,084,946 | 4/1978 | Burgess ............... 55/199 X |
| 4,116,288 | 9/1978 | Love .................... 175/66 |
| 4,146,483 | 3/1979 | Lee ..................... 209/272 X |
| 4,159,947 | 7/1979 | Brooks et al. ......... 210/386 X |
| 4,209,381 | 6/1980 | Kelly ................... 208/8 LE |
| 4,212,745 | 7/1980 | Jellesma ............... 210/401 |
| 4,240,902 | 12/1980 | Agee et al. ........... 209/247 X |
| 4,255,269 | 3/1981 | Timmer ................ 175/66 |
| 4,295,534 | 10/1981 | Zachmeier ............ 175/66 X |
| 4,350,591 | 9/1982 | Lee . | |

FOREIGN PATENT DOCUMENTS

| | | |
|---|---|---|
| 2390191 | 12/1978 | France . |
| 55-20635 | 2/1980 | Japan . |
| 55-144462 | 11/1980 | Japan . |
| 1529609 | 10/1978 | United Kingdom . |
| 1416186 | 12/1978 | United Kingdom . |
| 1255065 | 12/1980 | United Kingdom . |
| 2049759 | 12/1980 | United Kingdom . |
| 1050724 | 10/1983 | U.S.S.R. . |

OTHER PUBLICATIONS

A. Mezhloumov, "Ispol'-Zovaniye Aerirovannykh Zhidkostei pri Provodke Skvazhin", Moscow, Nedra Pbulishers, 1976, pp. 50-54.

Primary Examiner—Richard V. Fisher
Assistant Examiner—W. Gary Jones
Attorney, Agent, or Firm—Mason, Fenwick & Lawrence

[57] ABSTRACT

A method and apparatus for rejuvenating oil well drilling mud is provided by an endless filter which is supported by a pair of spaced driven drums; drilling mud is distributed onto a moving flight of the filter at spaced locations so as to provide layers of the drilling mud on the filter. Passage of the drilling mud through the filter is assisted by spraying the drilling mud with drilling mud which has passed through the system (filtrate) and by applying suction to the underside of the filter. The drilling mud, after passing through the filter is degassed in a second stage degasser. The filter is cleaned by a solution spray, and by back washing with air and either water or diesel oil.

19 Claims, 38 Drawing Figures

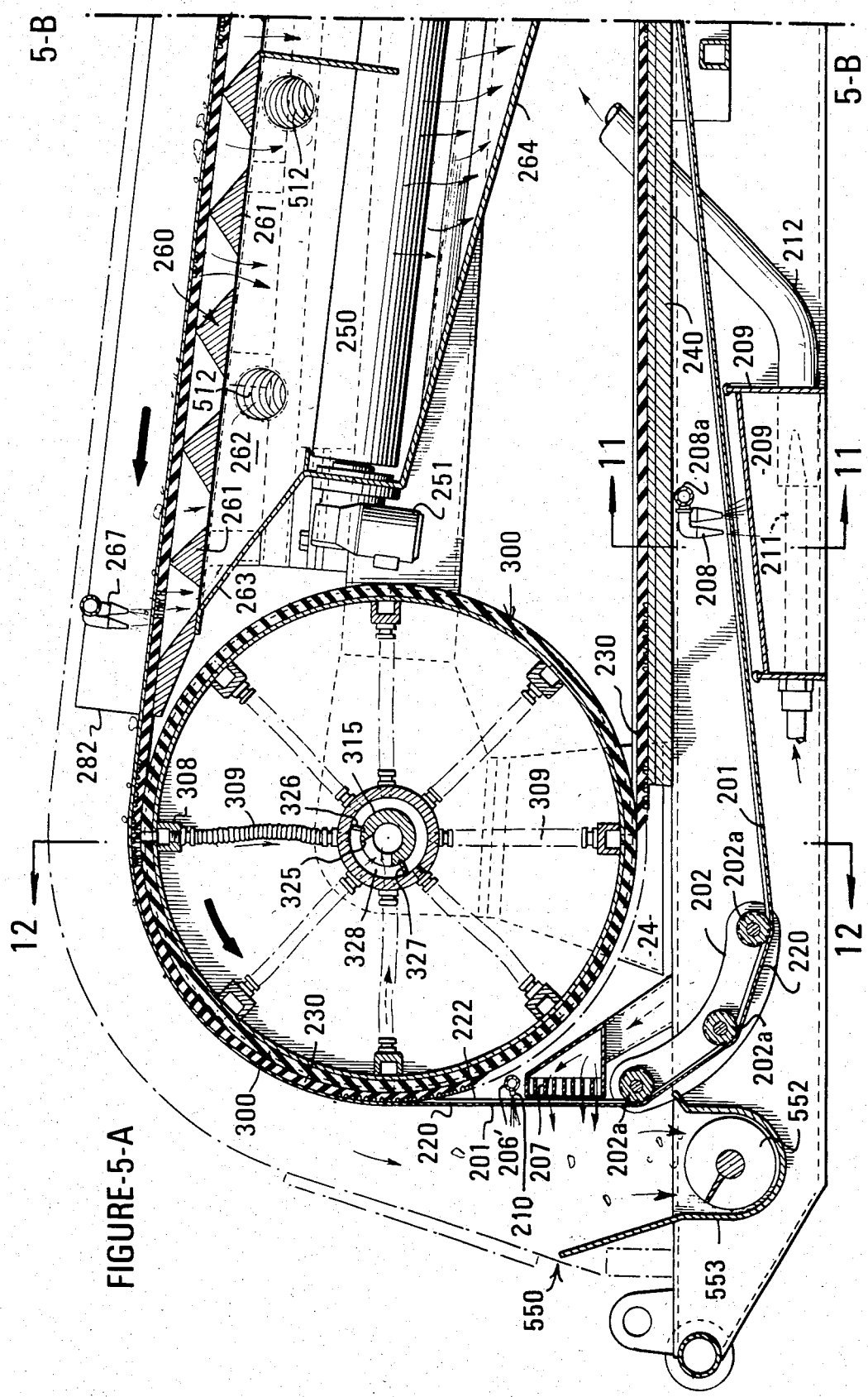
FIGURE-5-A

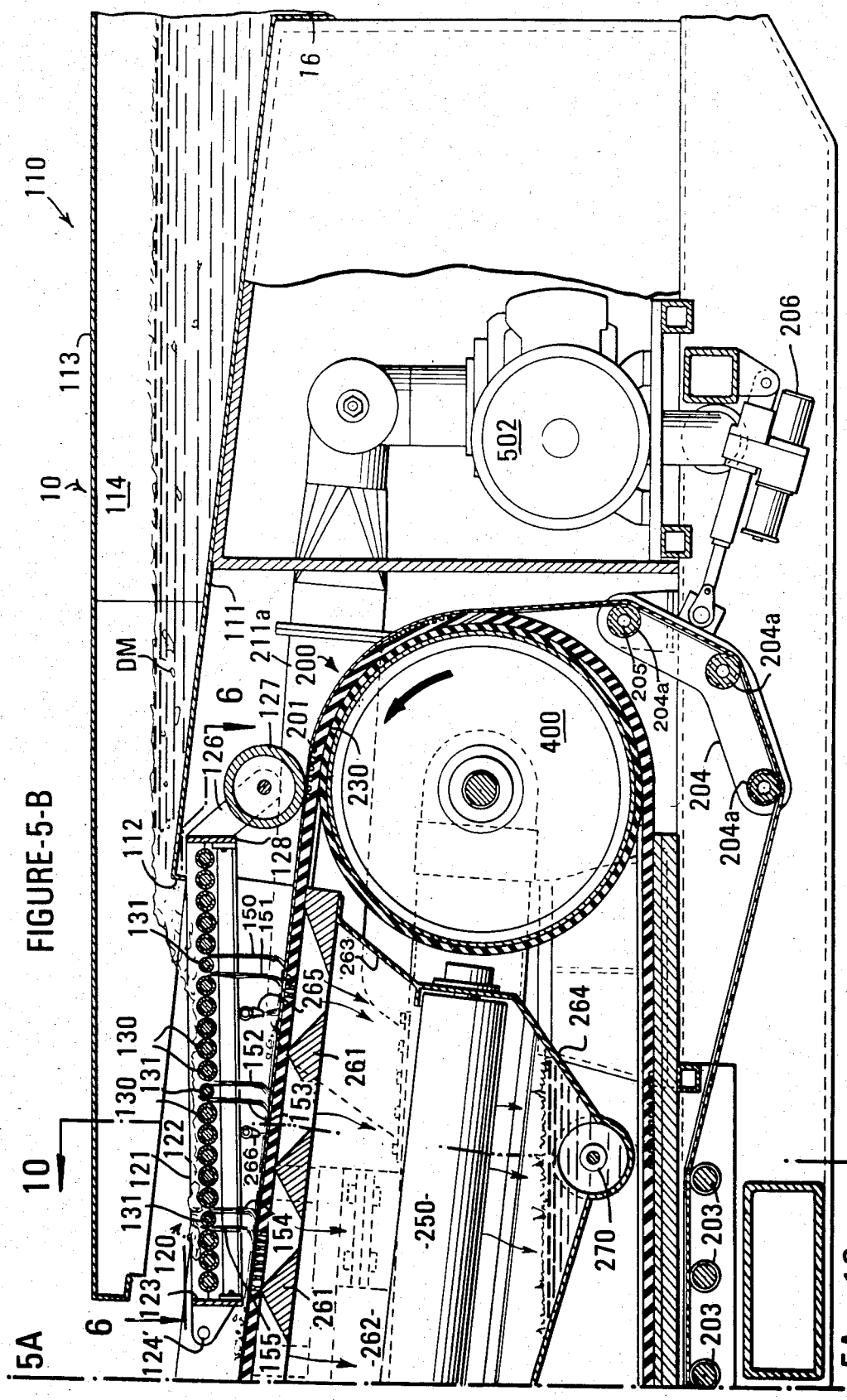

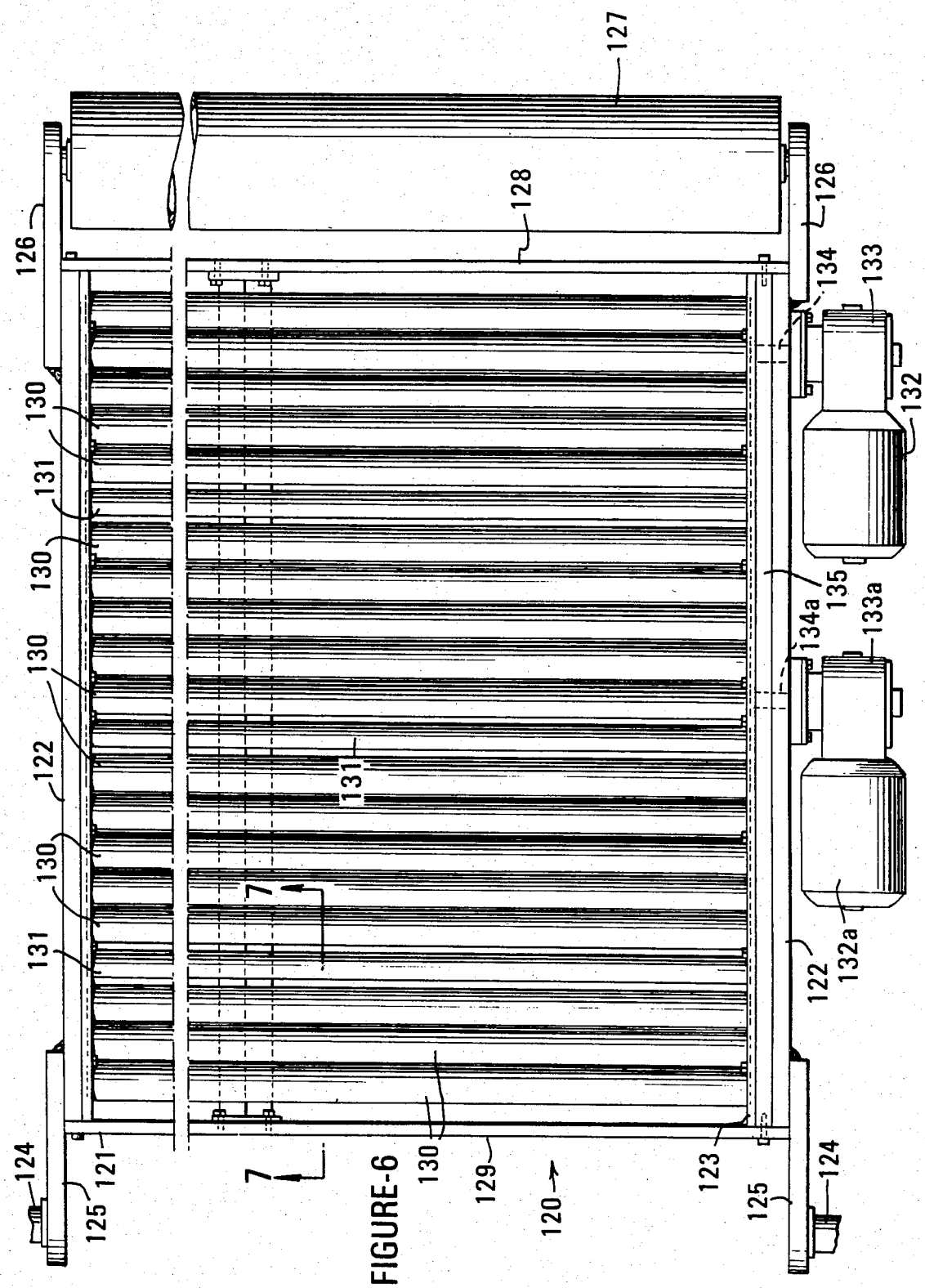

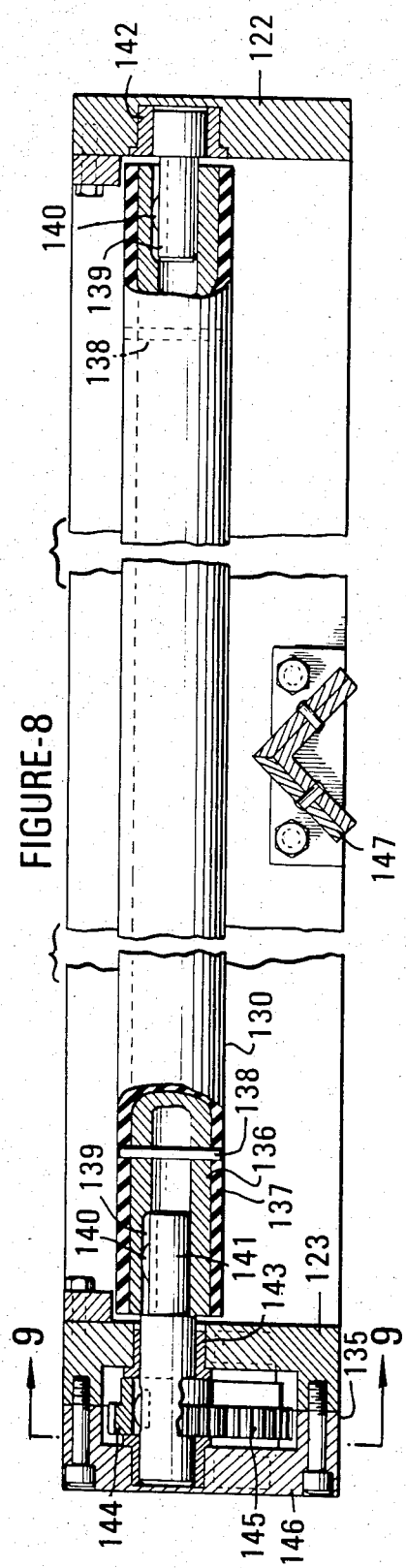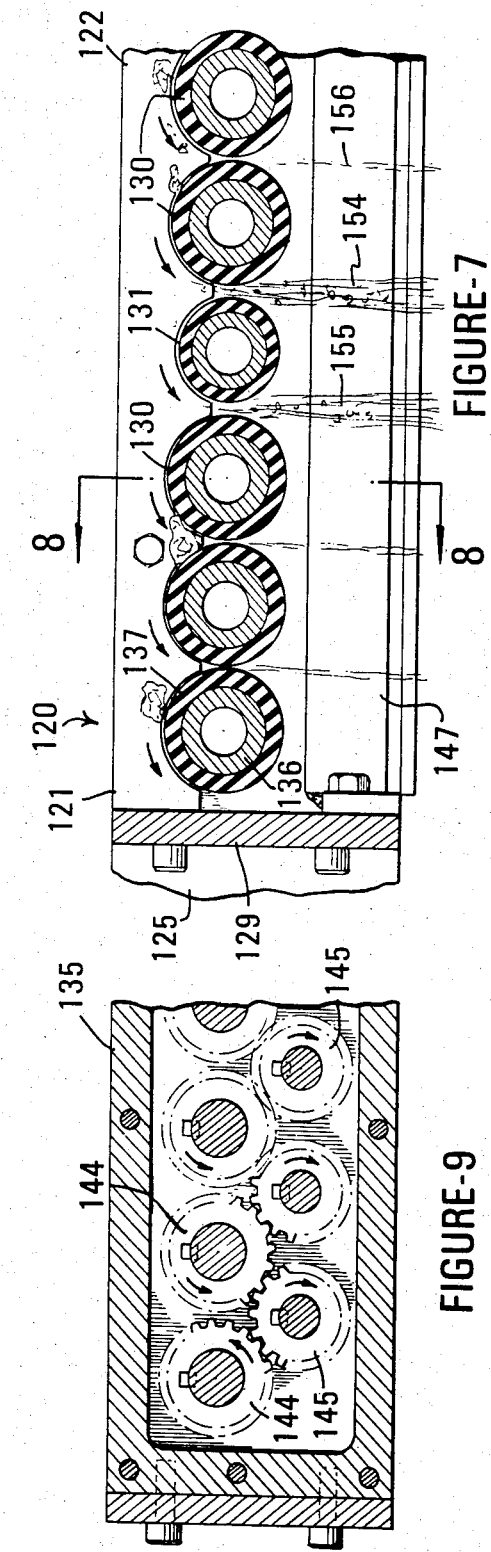

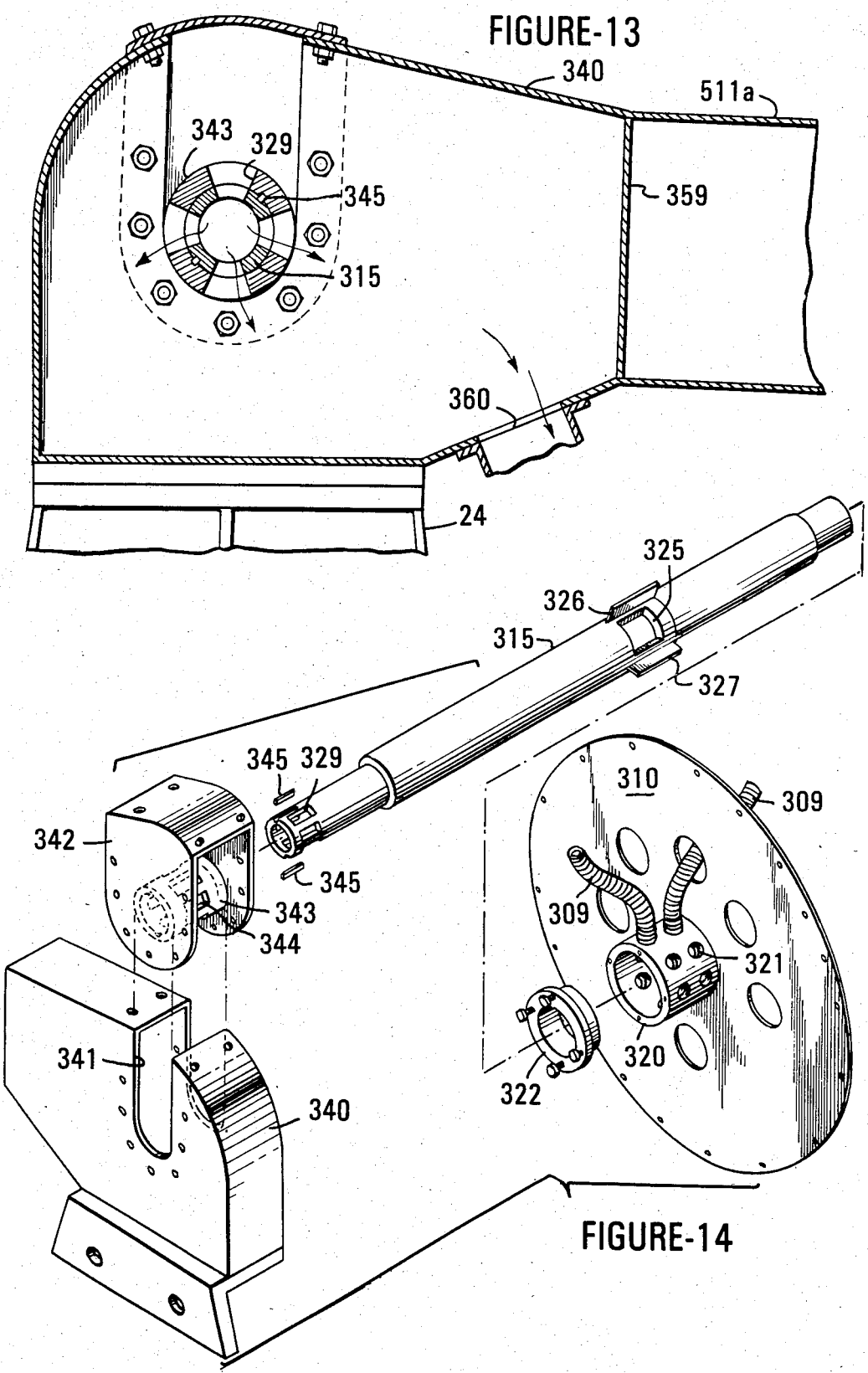

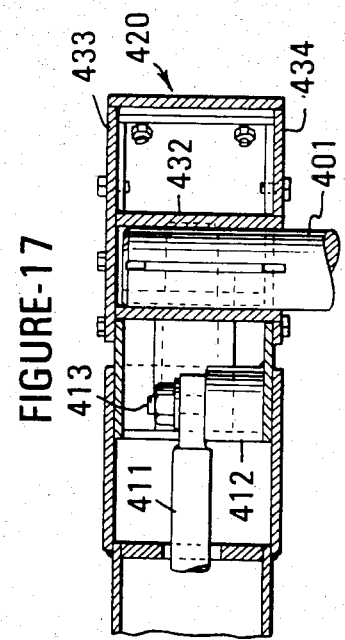
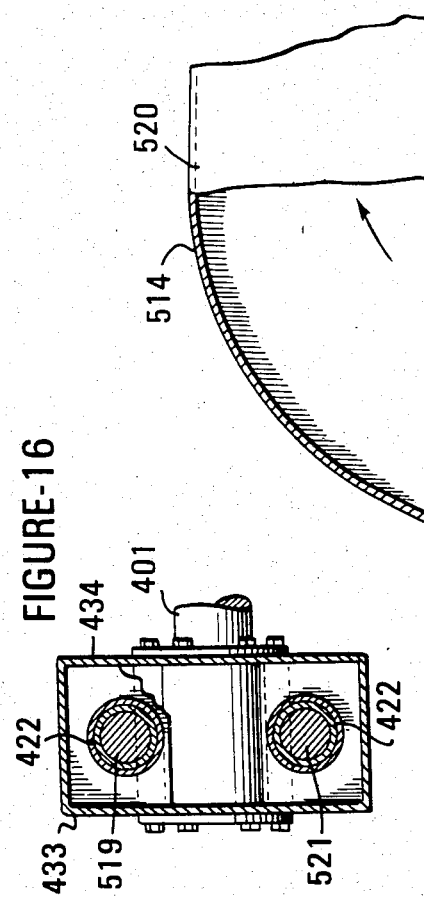
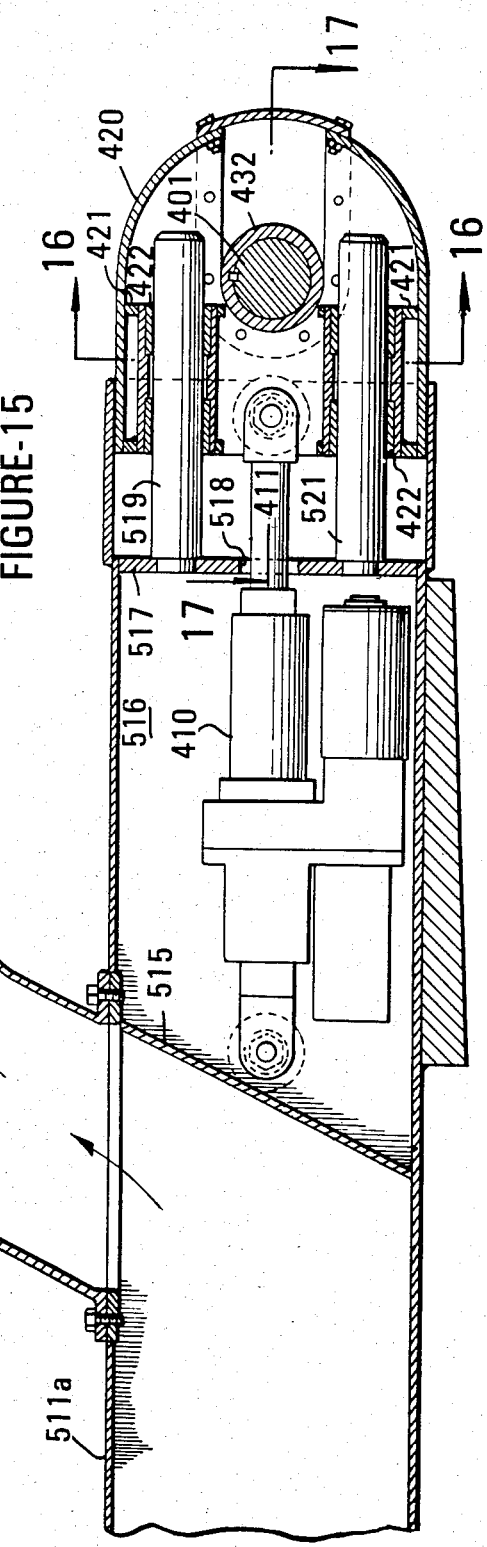

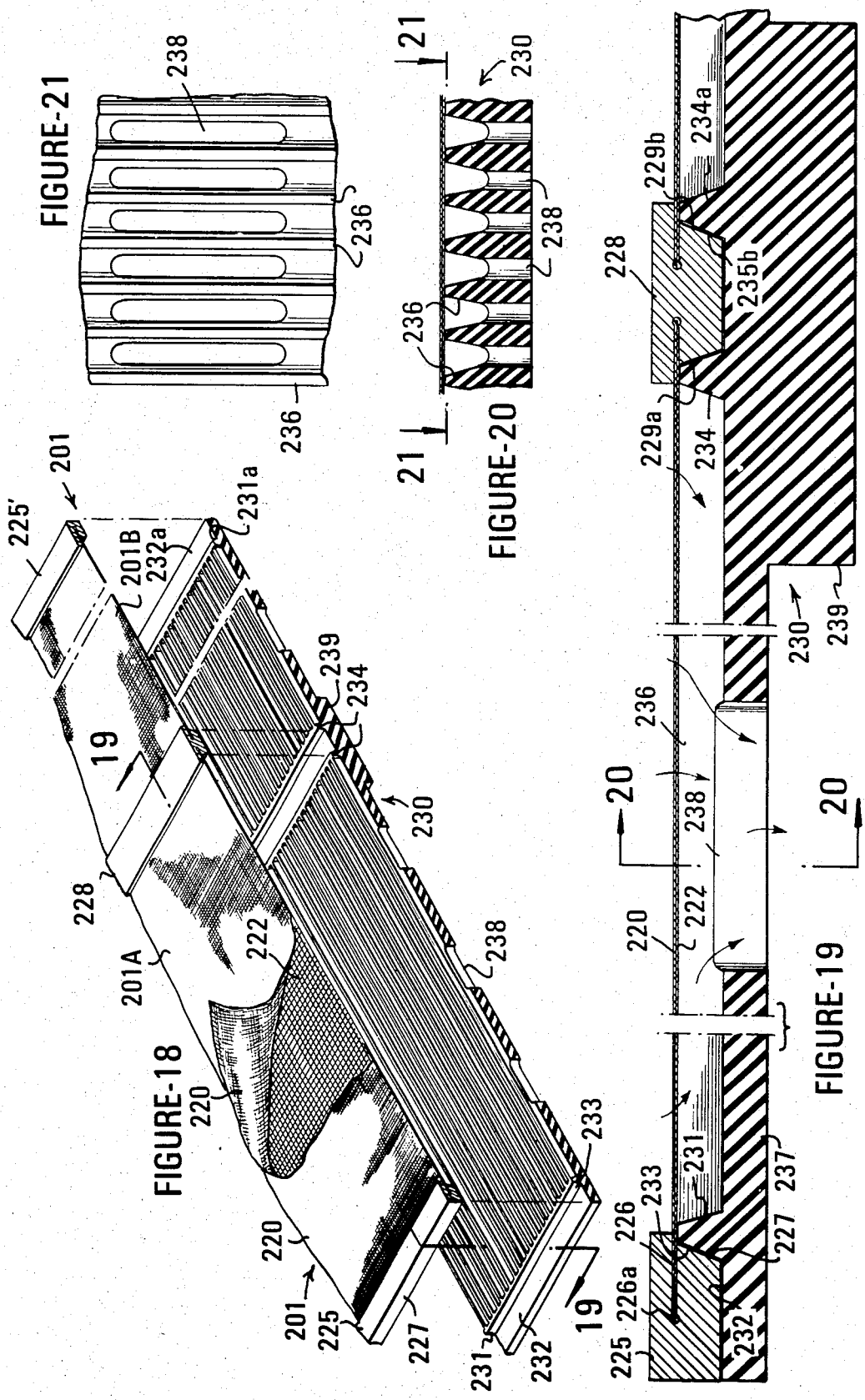

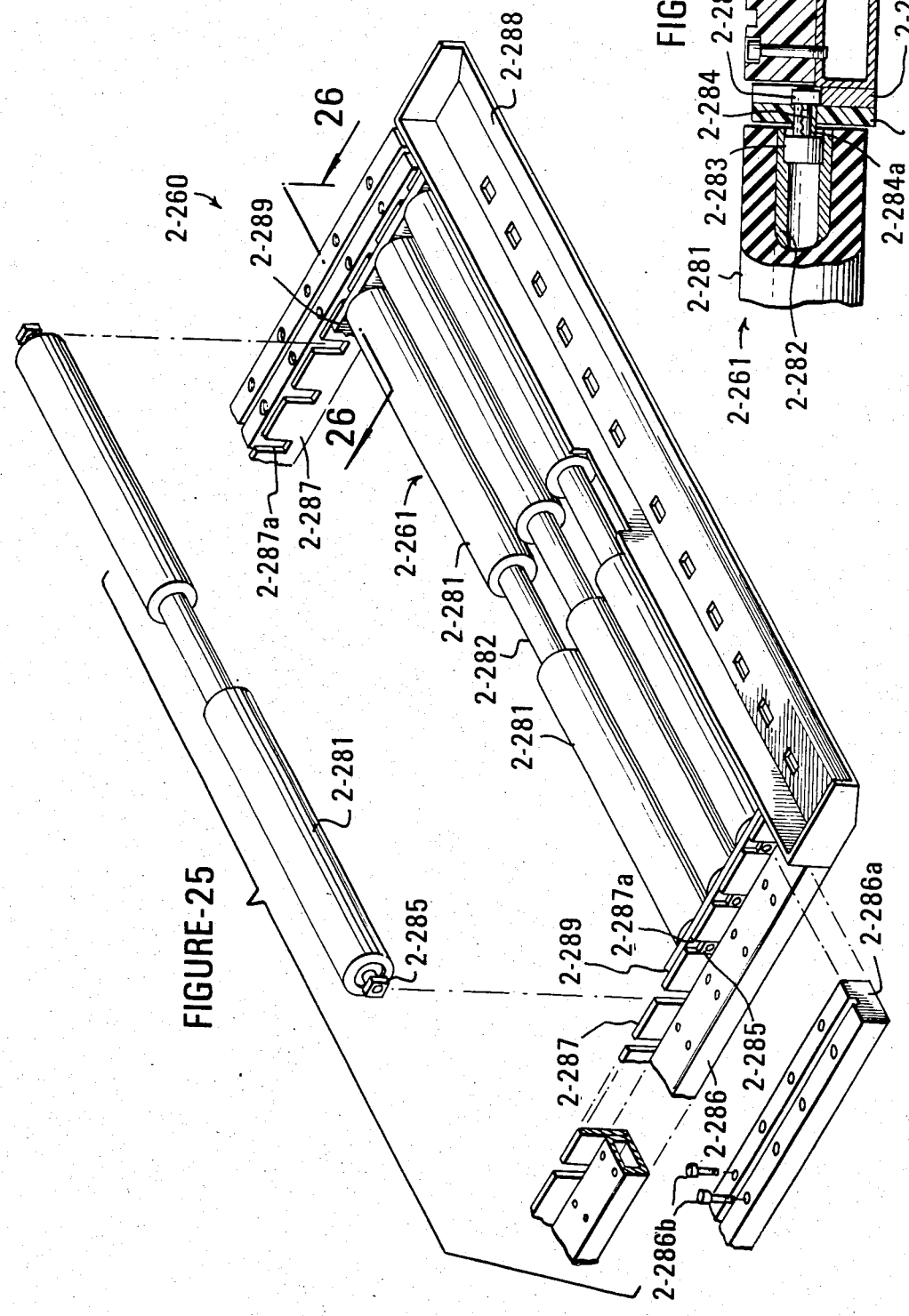

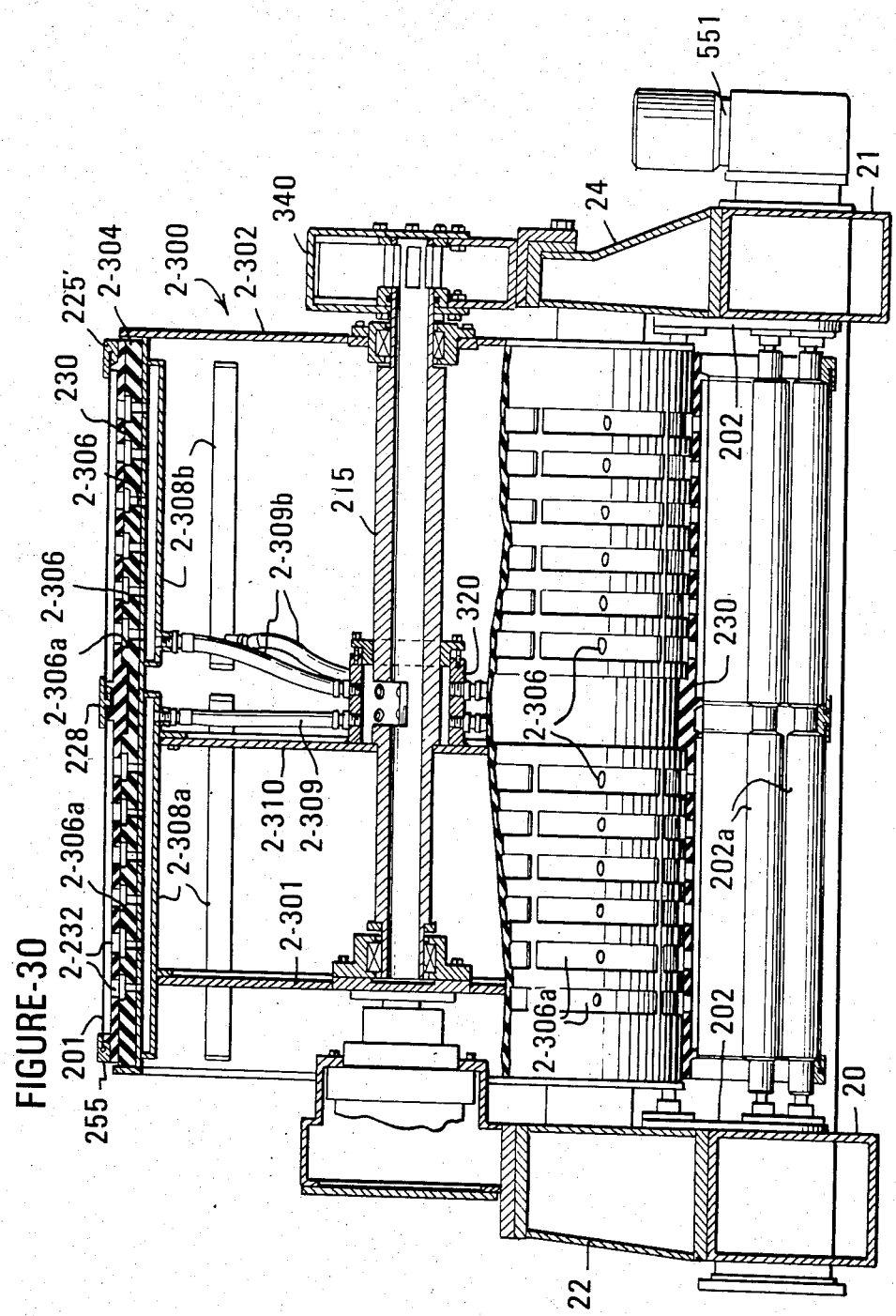

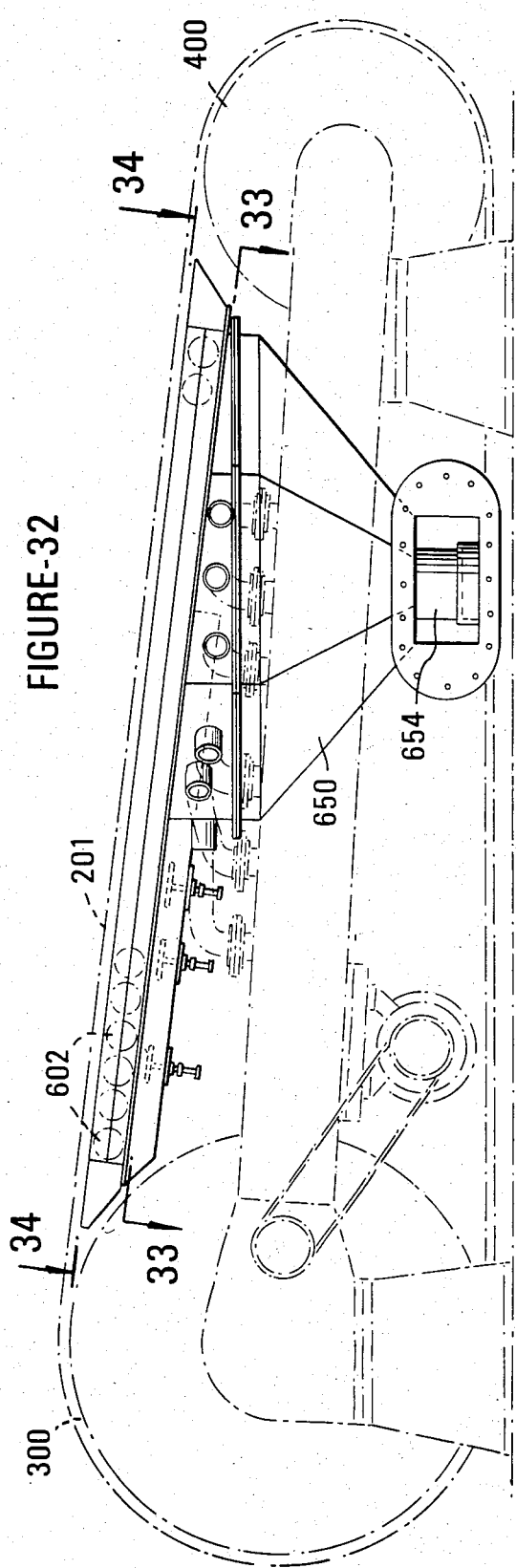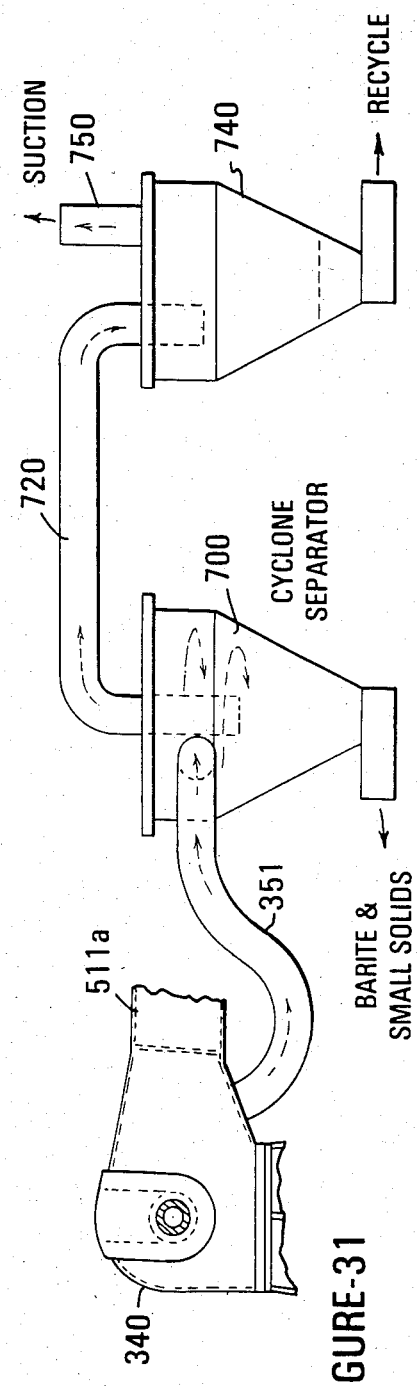

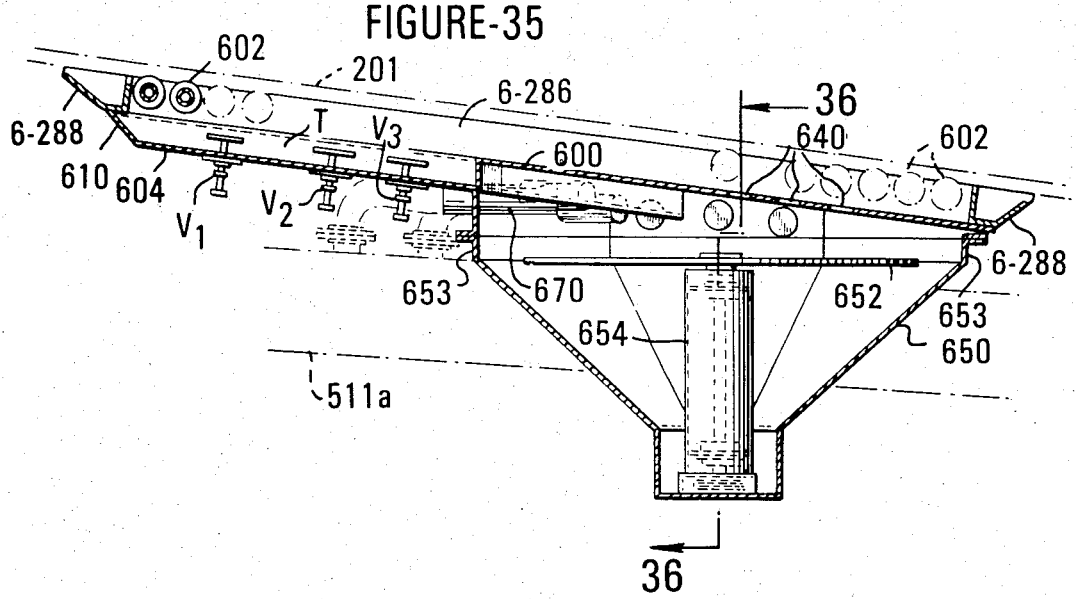
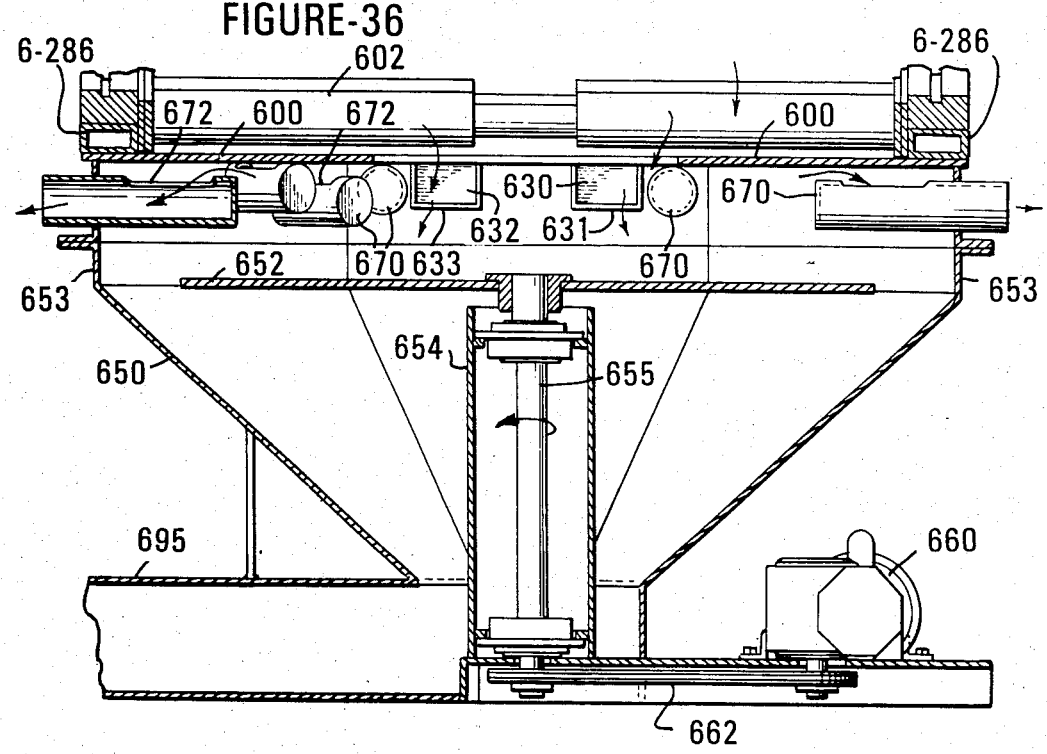

SINGLE PASS MUD REJUVENATION SYSTEM AND METHOD

BACKGROUND OF THE INVENTION

The present invention is directed to a method and apparatus for rejuvenating drilling mud from an oil, gas or other similar well.

In the drilling of oil wells, drilling mud is forced down the drill string emerging therefrom at the drill bit, and then passes upwardly on the outside of the drill string, between the drill string and the wall forming the bore hole. The drilling mud functions to carry the cuttings to the surface, to control the pressure in the formation being drilled to lubricate the drill string and the bit and to avoid sidewall collapse of the bore hole. At the present time, various additives are supplied to the drilling mud to improve its performance. Since the drilling mud has substantial value it is desirable that it be recovered, and rejuvenated for reuse. Rejuvenation includes the removal of solids, which are introduced into the drilling mud as cuttings. The terms "solids" and "cuttings" as used hereinafter refer to stone or earth particles cut from the earth by the drilling bit. The condition of the drilling mud is of extreme importance. It is known that the inclusion of solids in the drilling mud has such harmful effects as decreasing the life of pumps and other expensive equipment. Further, it is desirable that expensive additives, such as barite not be discarded, that substantially all of the entrained gases and air be removed, and that the drilling mud not be diluted. At the present time, it is conventional to remove solids by such devices as shale shakers, desanders, desilters, and centrifuges. Degassers are also utilized.

Thus, the drilling fluid must be maintained in good physical and chemical condition in order to be able to do its work. The cuttings range in size from large pieces ($\frac{3}{4}$ in. diam.) to very fine particles. The large cuttings, if permitted to be circulated in the fluid down the drillpipe, would plug up the rock bit channels and the drill string tools and must be removed from the drilling fluid (mud). Removal of the large cuttings is accomplished easily by passing the drilling fluid stream over a vibrating coarse screen (shale shaker) where the large pieces are screened out. On the other hand the smaller cuttings particles in the drilling fluid are not easily removed and their presence can have very detrimental effects on the entire drilling process. As solids content builds up, rate of penetration of the bit is reduced (due to unnecessary redrilling of rock), severe abrasion of the rock bit and drill string tools takes place and the properties of the drilling fluid itself are seriously impaired and tend to become uncontrollable.

One method of removing the smaller sized particles from the mud stream is by dilution of the whole mud volume by adding water. This is often impractical and almost always expensive. The costs of adding water, providing for more pit volume, etc., will generally make it more desirable to remove solids mechanically such as by screening. However, dilution is frequently used to reduce solids content during drilling of the surface hole (the upper or shallower portion of the hole).

In a typical apparatus, the drill mud from the drilling apparatus is passed through six modular units or work stations comprising: (1) a shale shaker; (2) a degasser; (3) a desander; (4) a desilter; (5) a mud cleaner and (6) a centrifuge. The mud is initially fed into a shale shaker which separates large particles with the remaining drilling mud then being delivered to a first tank. It is pumped from the first tank, through a degasser, and enters a second tank. It is then pumped from the second tank and passed through a desander, and enters a third tank. It is then pumped through a desilter, or a mud cleaner, which, like the desander, is in the form of a cyclone filter or cleaner. It then enters a fourth tank, and it is delivered to the mud tank or mud holding tank from the fourth tank.

Accordingly, the mud is moved in a batch type operation form one module (unit) of equipment to the next module by means of at least three energy consuming centrifugal pumps. Since the use of all modules of the equipment is not a continuous operation, only a portion of the total drilling fluids stream is actually processed through the entire system. The economics of a mud system depend heavily on the daily treatment costs while drilling. Mud is treated in two ways—with treating chemicals and with mechanical equipment. One of the primary causes of high daily treatment cost is due to cuttings (also referred to as "solids") which become incorporated in the mud. The solids are chopped into finer particles each time they pass through a pump; this causes substantial wear and tear on the pumps and also makes removal of the solids even more difficult due to the buildup of the small particles.

The solids consequently create many problems as they become dispersed throughout the mud system and since they accumulate with continuous drilling, they must eventually be dealt with. The solids are removed by batch type fine screening, desanding, desilting, and centrifuging operations. Except for screening, which classifies and removes drilled solids which are coarser than the openings in the screen, the other types of equipment employed are extremely inefficient in removing solids. In fact, hydrocyclones, which are used in desanding and desilting and centrifuges are not classification devices.

It is generally accepted in the industry that present equipment usages permit no better than 50% removal of the solids of given size from the mud. While some mud systems have multiple units for "better" solids control, the costs are excessive. On a typical deep well where mud costs are high, equipment rental costs on the average are $1,500 per day. Deeper wells sometimes incur equipment rental costs in excess of $2,000 per day. Horsepower requirements for the pump and module operation of the equipment ranges from 430 to 450 Hp. Moreover assembly and piping costs often equal the buy-out price of the equipment. It will consequently be apparent that present known approaches to drilling mud treatment are both functionally inadequate and financially burdensome.

Although there have been proposals for simpler methods and apparatus for treatment of drilling mud such as in Lee U.S. Pat. No. 4,350,591, such apparatus has not found any substantial acceptance in the industry. This apparatus utilizes a filter belt passing over drums, and vibrating plates in engagement with the drilling mud delivered to the filter to assist in forcing the drilling mud through the filter.

Consequently, the heretofore used equipment has been intended to solve the problem of removing solids with it being recognized that the solids are in the form of particles varying in size between about 1.5 microns up to about 0.75 inch. To properly rejuvenate drilling mud, these solids must be substantially entirely removed, and, in addition, gas contained in the drilling mud must be removed to the fullest extent possible.

Therefore, the primary object of the present invention is to provide new and improved methods and apparatus for the treatment of drilling mud.

SUMMARY OF THE INVENTION

The present invention is directed to methods and apparatus for rejuvenating drilling mud received from an oil, gas or other type well (hereinafter singly referred to as "well"). The most unique characteristic of the invention is that it is a single pass system through which all of the mud is circulated following its discharge from the wellhead; after treatment the mud is again ready to be pumped down the well.

The apparatus includes an entry weir, which receives the drilling mud and which accommodates to surges in the delivery of the drilling mud from the well rig to the apparatus. The entry weir includes a receiving and holding chamber, with an overflow weir lip, over which the drilling mud passes; this causes the drilling mud to leave the entry weir in a laminar flow as compared with the tubulant entry flow of the drilling mud.

The drilling mud from the entry weir is delivered to a "rolling" distribution weir positioned below the distribution weir and which functions to distribute the drilling mud onto a moving filter belt assembly at spaced locations along the moving filter belt. This result is achieved by virtue of the fact that the drilling mud is delivered in curtains or sheets, so that there is a layering of drilling mud onto the filter belt assembly. A significant degassing of the drilling mud also occurs during the delivery of the mud onto the filter belt assembly. The distribution weir preferably is constructed of a plurality of parallel rollers which are driven in the same direction with the rollers comprising a first group of upstream rollers driven at a relatively higher speed and a second or downstream group of rollers driven at a relatively lower speed. The rollers are placed with their axes uniformly spaced, and one or more of the rollers are of reduced diameter, thereby providing a relatively larger space between these reduced diameter rollers and the adjacent rollers; very little space is provided between the remainder of the rollers, of normal diameter, so that there is little if any drilling mud passed between the space between the rollers of normal diameter. The drilling mud thereby passes through the slot-like spaces between the rollers of reduced diameter and the adjacent normal diameter rollers in the form of curtains or sheets and will engage the driven filter belt along its path of travel, depositing or delivering the drilling mud onto the filter belt in layers. Passage of the mud through the slot-like spaces between the rollers also serves to remove gas from the mud.

The driven filter belt assembly is in the form of a multi-part continuous band, including an outer fine mesh stainless steel, nylon or the like screen and a supporting screen formed of course mesh stainless steel or the like which is positioned beneath the fine mesh screen and supports same. The filter belt assembly is supported on a rubber or the like support belt which extends around a pair of spaced drums, one of which is an idler drum, and the other being a driven extraction drum. A filter belt supporting vacuum table is positioned between the two drums and has a pan connected to suction pumps through a conduit system positioned beneath it. The reduced pressure within the pan and beneath the vacuum table assists in drawing drilling mud through the filter assembly. The vacuum table comprises either spaced, parallel bars, the upper portions of which are engaged by the support belt, or spaced rollers which are engaged by the support belt.

The passage of the drilling mud through the filter belt is assisted, not only by the reduced pressure beneath the vacuum table, but by the spraying of drilling mud filtrate onto the drilling mud deposited by the distribution weir onto the filter belt. The term "filtrate" as used herein means drilling mud which has passed through the apparatus in accordance with the present invention.

Passage of the drilling mud through the filter serves to leave cuttings of a size larger than a given size as determined by the mesh size of the fine mesh screen from the drilling mud on the upper surface of the filter belt, and also removes gases which are entrained in the drilling mud in relatively large bubbles. The cuttings above the given size remain on the upper surface of the fine mesh screen and are conveyed to a discharge conveyor for disposal. Gases in the drilling mud in smaller bubbles will pass through the filter belt with the drilling mud, and these gases are substantially subsequently entirely removed by a second stage degasser.

The second stage degasser in a first embodiment comprises a pair of spaced parallel rollers located in the bottom portion of the pan positioned below and parallel to the path of the filter belt. The rollers are caused to rotate in opposite directions, so as to force drilling mud downwardly from the pan, the rollers being provided with seals between them and the pan to prevent the transfer of mud or other material past the rollers other than through the narrow space between the rollers. The mud which passes through the space between the rollers, and which is impelled by them, strikes an anvil plate extending along and beneath the rollers, thereby removing gas from the drilling mud. These gases are withdrawn from the chamber in which the anvil plate is located, through suction conduits, the mud thereby being rejuvenated and comprises the above-noted drilling mud filtrate. The rejuvenated mud is delivered from the system either by an ejection pump using filtrate as the impelling fluid or by gravity.

In a second and third embodiments, the second stage degasser includes a housing having a wall, with a generally horizontal rotating disk inwardly of the wall. An outlet opening from the pan into which the drilling mud passes after its passage through the filter is provided above the disk. The disk is rotated by a motor and transmission gearing, and causes the mud to be thrown against the cylindrical wall, where entrained gas is caused to separate from the drilling mud. The drilling mud then flows downwardly along the wall of the housing to a sump, and this drilling mud filtrate is then removed from the system, as above described. The released gases are withdrawn from the housing of the second stage degasser either by a separate conduit, or through the outlet opening from the pan. In one embodiment two such degasser units are employed.

As was noted previously, the filter assembly includes an endless loop fine mesh screen and a supporting screen which engages and rides on a supporting belt. The endless fine mesh screen has a mesh size to remove particles, and is provided with an underlaying supporting screen which is stronger, and of wider mesh. The two screens are connected by longitudinally extending strips, including a pair of edge strips and a centrally positioned intermediate strip. These strips, which are preferably made of neoprene rubber, are provided with slits which extend longitudinally, the inner ends of the slits having bores. The edges of the two screen elements extend into the slits, and enter into the bores, being held therein by suitable means, such as glue. A supporting belt underlies the supporting screen and has trough separating upstanding ridges extending transversely with openings in the troughs to permit the flow of mud therethrough.

After the filter assembly has traversed almost the entire length of the vacuum table, substantially all of the drilling mud has been drawn through the assembly, leaving solid particles on the outer surface of the fine mesh screen; it is recognized that the solid particles may have "piggy-back" materials on them such as barite which may be of substantial value, and should be recovered. To effect recovery, the filter belt with the solid particles on it, is subjected to a wash immediately upstream of the extraction drum, the wash liquid being either water or diesel oil, in accordance with the characteristics of the drilling mud. This wash breaks up the "bridges" and causes the valuable particles to move into the extraction drum. The wash fluid does not pass through the filter, thereby avoiding dilution of the drilling mud. Removal of the wash fluid is provided by extraction through the extraction drum over which the filter assembly passes. Barite passes into the extraction drum with the wash fluid, but is subsequently separated and recovered.

The filter assembly passes around the extraction drum, and large solid materials on it such as cuttings are dislodged by centrifugal force and collected in a solids removal system which includes a screw conveyor. The extraction drum is rotatable mounted on a hollow shaft, and comprises a cylinder having openings therethrough, the filter engaging the outer surface of the cylinder which is an elastomeric facing layer, and which is also provided with openings in registry with the openings in the cylinder. Suction nozzles on the inside of the cylinder are connected through the hollow shaft to a vacuum pump, and hence draw wash liquid through the filter, as well as any remaining drilling mud lodged in the filter, to thereby remove residual material from the filter. The drum is rotated, by a motor and transmission, and a baffle structure is provided between the hollow shaft and a sleeve around it, and connected with the drum, so that extraction is effected only through a limited arcuate zone of rotation of the extraction drum.

The screen assembly and the supporting belt are separated as they leave the drum, and the screen is further cleaned by back washing it, utilizing a high velocity air nozzle and an array of nozzles extending transversely of the screen and supplied with drilling mud filtrate under pressure.

The present invention has many advantages, including the provision of an energy efficient method and apparatus for rejuvenating drilling mud by a single pass single treatment system and method. All of the mud is treated and substantial savings in energy are achieved by the elimination of power consuming centrifugal pumps. Moreover, there is no centrifugal pumping of fluid containing cuttings and the chopping of such cuttings into smaller difficult (if not impossible) to remove particles is consequently avoided. The entry weir absorbs the surges, and the distribution weir distributes the drilling mud laterally across the filter, so as to provide full usage of the filter area, and enables the drilling mud to be drawn through the filter, with the aid of suction, at a relatively high volume per unit of time.

The present invention apparatus and method provides for rapid passage of the drilling mud through the filter through the utilization of forcing sprays of filtrate, and of suction, on opposite sides of the filter.

The distribution weir removes some gas, and the drawing and forcing of the drilling mud through the filter removes both solids and additional entrained gas, the remaining gas being substantially entirely removed in the second stage degasser, so that with the present system and method, substantially complete removal of gas from the drilling mud is accomplished.

In addition to the above advantages, the present apparatus and method offer other significant advantages over presently used equipment. These additional advantages include the complete removal of those solids which are coarser than 400 mesh in unweighted drilling muds, and solids coarser than 190 mesh in weighted drilling muds; also, flock solids in unweighted flocked drilling muds or fluids are removed. The cuttings which are discharged are cleaned of expensive "piggy-back" materials, such as barite, which is recovered and reintroduced into the drilling mud. Although prior art systems for handling oil based muds have required special handling techniques, the present apparatus and method require no special handling techniques or equipment for such muds. The equipment is reliable, and does not require continuous maintenance and observation, nor adjustments on a routine and continuing basis.

An extremely important advantage of the present apparatus is that in comparison to conventional equipment, it requires only about one third of the energy required by conventional systems.

The rejuvenated mud produced by the present apparatus and method will require less water or oil for dilution to control viscosity, and the cleaner rejuvenated mud which is produced by the present method and apparatus will provide better and thinner wall cake for the bore hole wall.

Through the use of the drilling mud rejuvenated in accordance with the present apparatus and method, superior drilling may be accomplished with downhole motors or turbines, and the drilling mud can be rejuvenated at relatively low cost. The removal of the solids, as hereinabove disclosed, provides improved pump life, with less erosion, of both pumps and bits, improved hole lubrication and improved rate of penetration of the drill bit.

As a result of the herein disclosed method and apparatus, completion cost of wells can be significantly reduced, and in deep and troublesome wells, this reduction is anticipated to be in the range of 25% over presently used methods and apparatus.

BRIEF DESCRIPTION OF THE DRAWINGS

FIG. 5A and 5B are cross-sectional views taken on lines 5A-B—5A-B of FIG. 4;

FIG. 6 is a view taken on line 6—6 of FIG. 5B;

FIG. 7 is a cross-sectional view taken on line 7—7 of FIG. 6;

FIG. 8 is a cross-sectional view taken on line 8—8 of FIG. 7;

FIG. 9 is a cross-sectional view taken on line 9—9 of FIG. 8;

FIG. 13 is a cross-sectional view taken on line 13—13 of FIG. 12;

FIG. 14 is an exploded perspective view of parts of FIG. 12;

FIG. 15 is a cross-sectional view taken on line 15—15 of FIG. 4;

FIG. 16 is a cross-sectional view taken on line 16—16 of FIG. 15;

FIG. 17 is a cross-sectional view taken on line 17—17 of FIG. 15;

FIG. 18 is an exploded, perspective, cross-sectional view of the filter forming a part of the present invention;

FIG. 19 is a cross-sectional view taken on line 19—19 of FIG. 18;

FIG. 20 is a cross-sectional view taken on line 20—20 of FIG. 19;

FIG. 21 is a cross-sectional view taken on line 21—21 of FIG. 20;

FIG. 25 is a perspective exploded view of a roller table forming a part of the mud rejuvenation system of FIG. 22;

FIG. 26 is a cross-sectional view taken on line 26—26 of FIG. 25;

FIG. 30 is a cross-sectional view taken on line 30—30 of FIG. 24A;

FIG. 31 is a schematic flow diagram illustrating the manner in which barite is recovered following extraction through the extraction drum of the three embodiments of the invention;

FIG. 32 is a side elevation view of a third embodiment of the invention;

FIG. 35 is a sectional view taken on line 35—35 of FIG. 34; and

FIG. 36 is a sectional view taken along lines 36—36 of FIG. 35;

MODES FOR CARRYING OUT THE INVENTION

Figure 1:
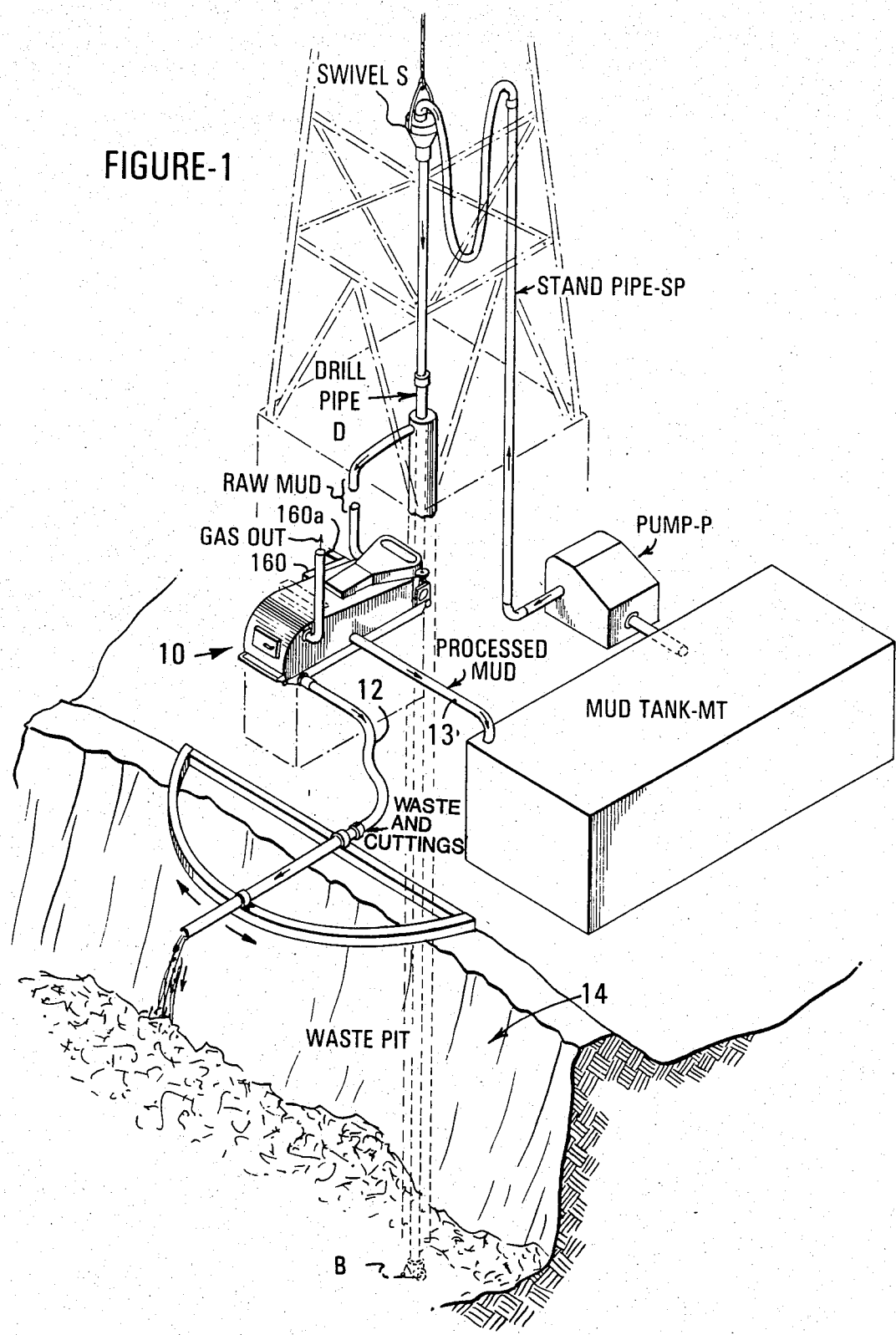
FIG. 1 is a diagrammatic view of an oil well drilling operation with the present invention employed therein.

Referring now to the drawings, wherein like or corresponding reference numerals are used for like or corresponding parts throughout the several views, there is shown in FIG. 1 a typical oil well drilling rig, including a drill pipe D, a bit B, a swivel S, a stand pipe SP for delivering drilling mud to the drill pipe D, drilling mud being pumped through stand pipe SP from the pump P, the mud being stored in the mud tank MT. The drilling mud as is conventional, passes down the drill pipe D and out through openings in bit B to return upwardly on the outside of the drill pipe. All of the mud from the well enters the mud rejuvenating apparatus 10 of the present invention for rejuvenation to its original condition. The rejuvenation apparatus 10 includes a gas vent or discharge pipe 11, a waste and cuttings discharge pipe 12 and a rejuvenated mud or filtrate pipe 13 extending therefrom. The discharge pipe 12 discharges into a waste pit edge lip and the filtrate pipe 13 discharges into the mud tank MT.

The mud rejuvenating apparatus 10 treats the drilling fluid pumped from the bore hole which weighs between 8.5-18 pounds per gallon, and has approximately 2% to 5% solids content by volume. The solids are ground or cut rock or earth materials (cuttings), and are from 1.5 microns to ½ inch in size. The apparatus 10 of the present invention removes the cuttings, and any entrained gas, and fully rejuvenates the drilling mud to the original condition that it had prior to being pumped down the well.

Figure 2:
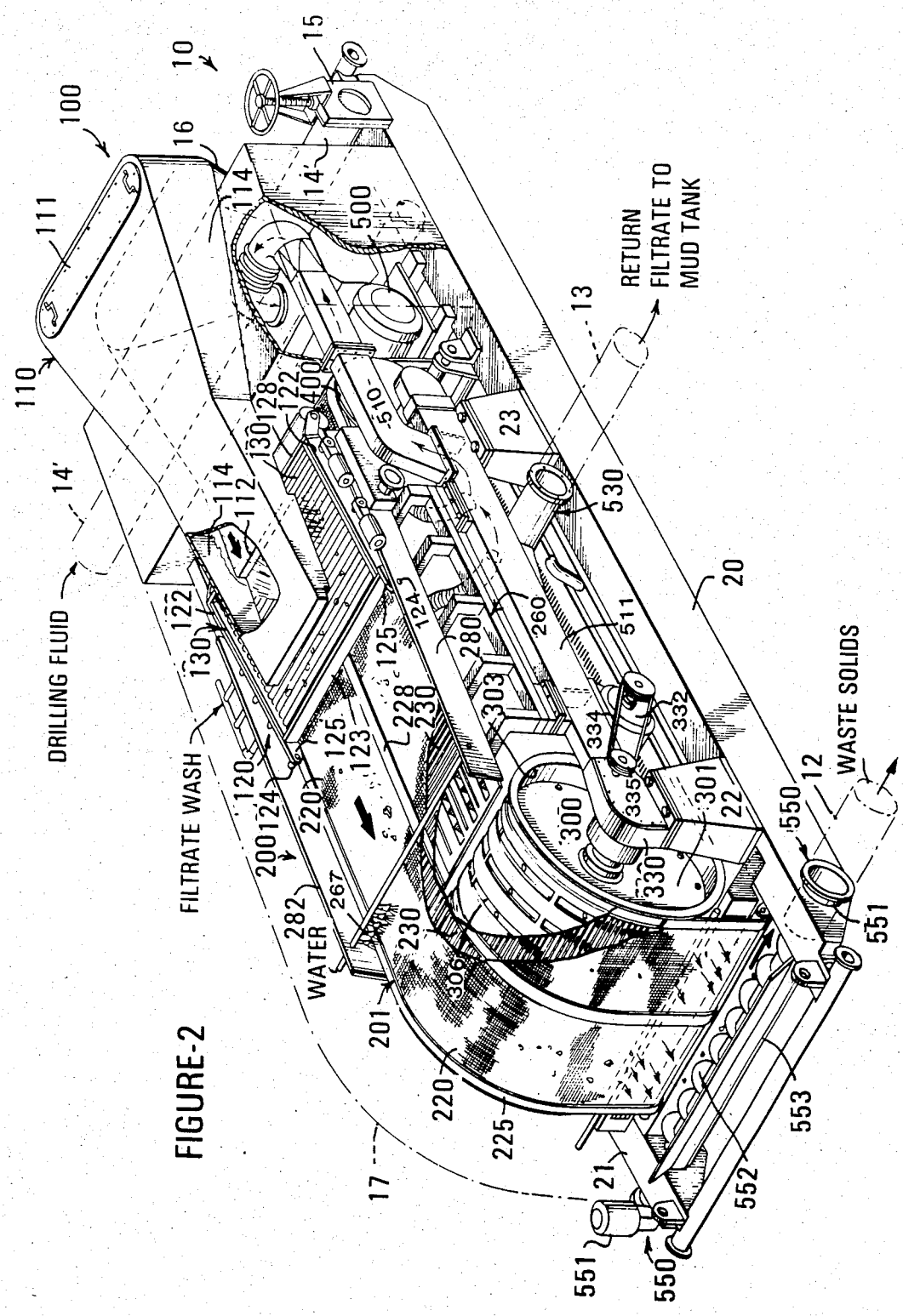
FIG. 2 is a perspective view, with parts removed, showing the mud rejuvenation system of the present invention.

The mud rejuvenating apparatus 10 of the present invention is illustrated in more specific detail in FIG. 2. The apparatus 10 includes pre-treatment means 100, which comprises an entry weir housing 110 and a rolling distribution weir 120. The entry weir housing 110 generally serves to receive drilling mud which is discharged over weir idyl 112. Mud is fed to housing 110 through pipe 14 and the housing is provided with a cover 111 which is positioned as shown in FIG. 2. The housing absorbs any surges in the delivery of mud and delivers the mud to the rolling distribution weir 120.

The rolling distribution weir 120 delivers the drilling mud to degasser filter apparatus generally designated 200, which includes a filter assembly 201 comprised of an outer fine mesh stainless steel screen 220 and a stainless steel support screen 222 (FIG. 18) of much larger mesh. Screens 220 and 222 are connected together at their edges by rubber strips 225 and 225' and a central or intermediate rubber strip 228. It should be understood that the screen might also possibly be formed of other materials. The filter assembly 201 is unitarily supported by a support belt 230, which is supported by a pair of drums comprising a driven evacuator drum 300 and an idler drum 400.

A vacuum system 500, a filtrate removal system 530 and a solids removal system 550 are also provided. The entire system maintains the drilling mud in motion throughout its processing, thereby avoiding stagnation which would cause settling out or segregation of heavy particles in the fluid, and restrictions or blockage in the apparatus.

Figure 4:
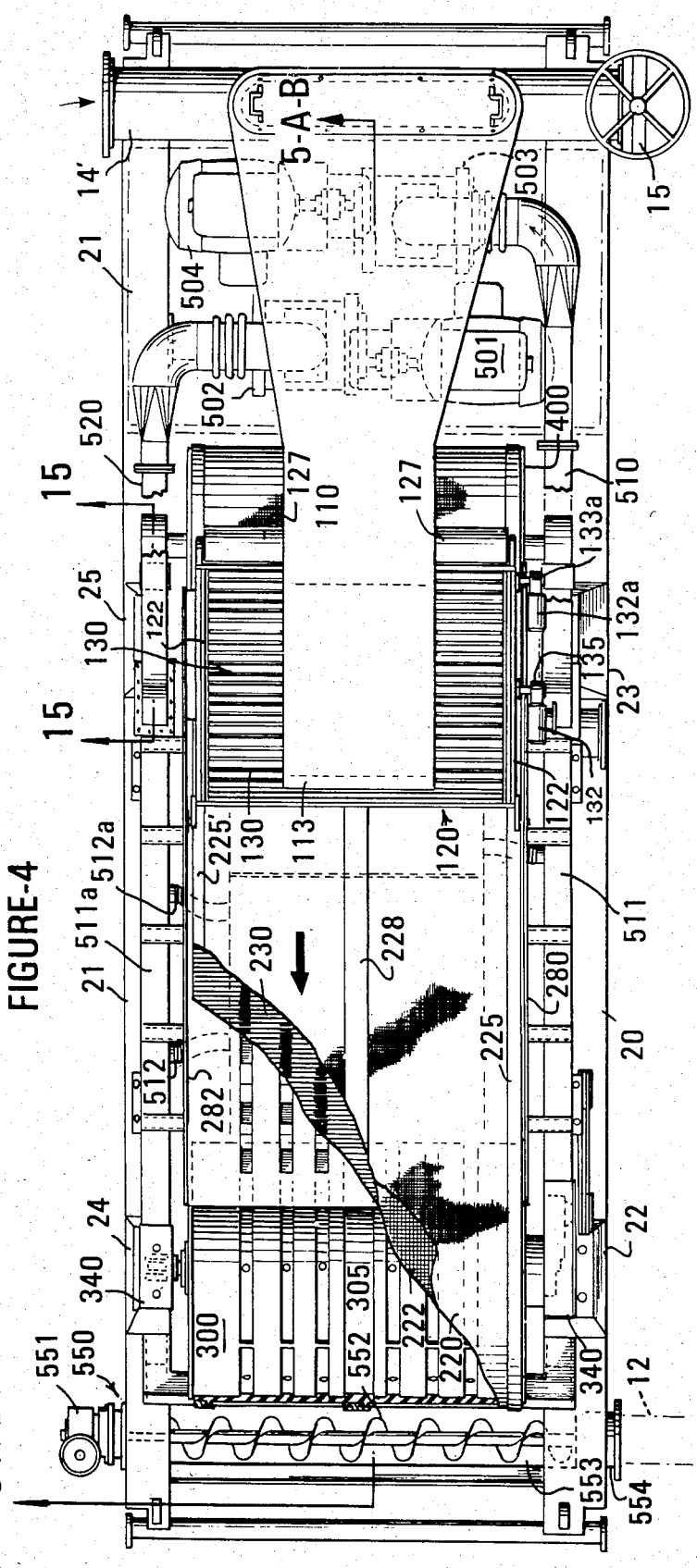
FIG. 4 is a plan view thereof of the mud rejuvenation system.
Figure 10:
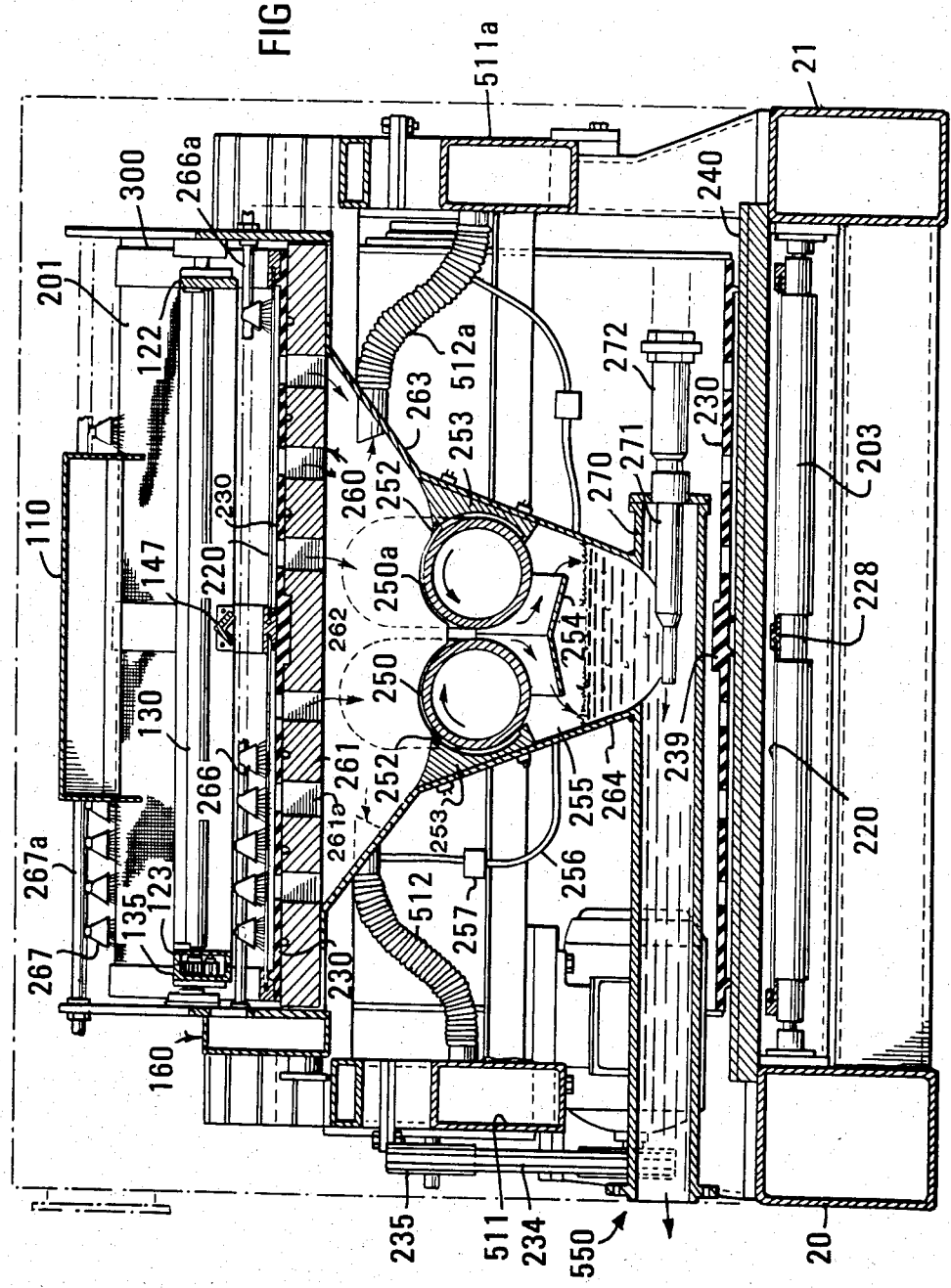
FIG. 10 is a cross-sectional view taken on line 10—10 of FIG. 5B.

The apparatus 10 includes a pair of side frame members 20, 21 (FIG. 10) which are hollow and of strong construction. Frame member 20 supports pillars 22 and 23 and frame member 21 supports pillars 24 and 25 (FIG. 4). Pillars 22 and 24 support drum 300 while pillars 23 and 25 support drum 400. The filter assembly 201, including the screens 220 and 222 and support belt 230, passes over a vacuum table 260 extending between the drums with an upper flight of the screen and belt being partially supported on the vacuum table.

Figure 3:
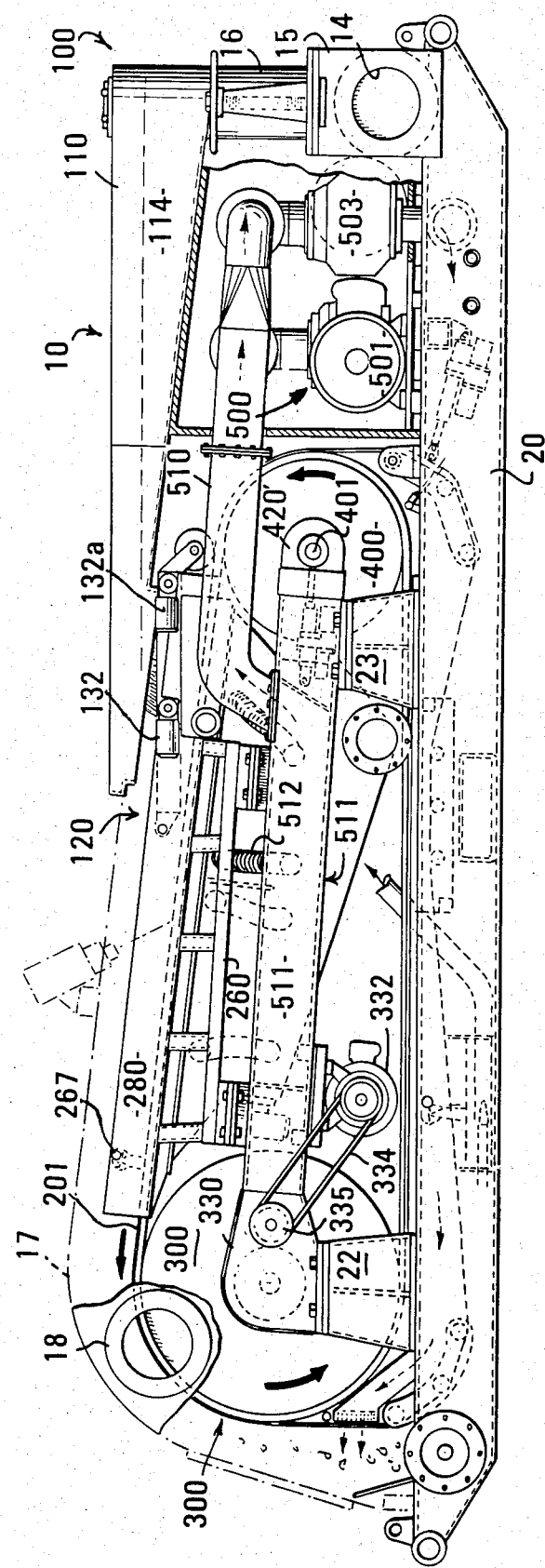
FIG. 3 is a side elevation, with parts removed, of the mud rejuvenation system in accordance with the present invention.

Drilling mud from a well is delivered to the mud rejuvenating apparatus 10 through a pipe 14' (FIG. 4) which terminates in a gate valve 15. Upstream of gate valve 15, the pipe is connected with a vertical riser 16 (FIG. 3), the upper end of which extends to and is connected with the entry weir housing 110. The riser 16 extends upwardly from the pipe 14' and enters the entry weir housing 110 at the lower end thereof. To the left of the riser 16 there are provided parts of vacuum system 500 including a motor 501 which drives a first vacuum pump 502 (see FIG. 4) and a second vacuum pump 503 driven by a motor 504. These motors and pumps underlie the entry weir housing 110 and the inlet of vacuum pump 503 is connected to a conduit 510 and vacuum pump 502 similarly has its inlet connected to a conduit 520 (FIG. 4). As shown in FIG. 3, the conduit 510 is connected to a conduit yoke 511 which extends forwardly to a drum drive housing 330 which is supported by the pillar 22. The conduit yoke 511 is supported, thereby, by the pillar 22, and at its opposite end by the pillar 23. The conduit yoke 511, in turn, serves to support the vacuum table 260. In FIG. 3, indicated partially by dashed lines, is a cover 17, having a gas outlet port 18 to which is connected the gas vent or discharge pipe 11 shown in FIG. 1. Conduit 520 is connected to a conduit yoke 511a and is similarly supported on pillars 24 and 25 on the opposite side of the assembly.

FIG. 4 discloses the general organization, including pillars 24 and 25 on the frame member 21, which in conjunction with pillars 22 and 23 serve to support the drums 300 and 400. The entry weir housing 110 is shown extending over and above the distribution weir 120. The solids removal system 550, which is best shown in FIGS. 2 and 4, includes a step-down drive motor transmission assembly 551 which is drivingly connected to a screw conveyor 552 in a trough 553 which connects with a pipe 554 coupled to the cuttings discharge pipe 12. The pipe 554 passes through the hollow frame member 20 as illustrated in FIG. 2.

The entry weir housing 110 has an upwardly slanting bottom wall 111 (FIG. 5B), so that entry weir housing 110 is deeper at its entry end above the riser 16 than it is at its discharge end, which is at weir edge lip 112. Above the inclined bottom 111, there is a cover plate 113, and side walls, such as side wall 114 complete the structure of entry weir 110. The discharge end of the entry weir housing 110 is located above the distribution weir 120 as is also shown in FIG. 2. The entry weir receives drilling mud from riser 16 which may flow into it in a turbulent manner. The entry weir housing 110, due to its size and capacity, functions as a surge absorber and the flow of mud over the lip 112 is basically laminar flow.

Rolling distribution weir 120 receives the drilling mud from the weir edge lip 112, and will be seen to include an open frame 121, having two spaced, parallel side frames 122 (FIG. 2), front frame 129 and rear frame 128. The frame 121 is mounted by pivot pins 124, 124' on arms 125, 125' for movement about a horizontal axis, frame 121 at its rear carrying a pair of legs 126 on which a mud barrier roller 127 is rotatably mounted, so that it is rearwardly of and supports the rear end of frame 121.

A plurality of parallel powered weir rollers 130, 131 extend between the sides 122 of the frame 121. Rollers 130 extend transversely of the filter assembly 201. All of the weir rollers are driven in the same direction by gears driven by motor means 132 having an output shaft into the gear box 135 and a second motor 132a connected to a transmission 133a having an output shaft 134a entering gear box 135. Weir rollers 130 are of the same size, and have their axes parallel to each other, and are relatively closely spaced. As a consequence, very little drilling mud passes between adjacent weir rollers 130. However, distribution weir 120 also includes at spaced intervals reduced diameter weir rollers 131 of smaller diameter than rollers 130 as illustrated in FIG. 5B. Since the axes of all of the weir rollers 130 and 131 are uniformly spaced, there is thereby provided a much wider spacing between reduced diameter weir rollers 131 and the adjacent weir rollers 130 than there is between two adjacent weir rollers 130. Consequently, drilling mud deposited on the tops of the rollers 130 and 131 falls in spaced curtains 150, 151, 152, 153, 154 and 155. The passage of the drilling mud between the rollers of distribution weir 120 effects liberation of any large gas bubbles entrained in the drilling mud which are, for example, one quarter inch in diameter and larger. In addition, relatively large particles such as shale and dehydrated clay (gumbo) are not transferred in the space between adjacent weir rollers, but are carried by the driven rollers 130, 131 to pass over the end of distribution weir 120, and fall downwardly onto the upper surface of filter assembly 201.

The filter assembly 201 is in the form of a continuous, web (loop) passing over drums 300 and 400 and having its upper flight positioned below the rolling distribution weir 120. Drums 300 and 400 rotate as indicated by the arrows thereon and the upper flight of the continuous filter assembly 201 consequently moves from right to left, as shown in FIGS. 5A and 5B. Also, the upper flight is inclined upwardly from drum 400 to drum 300. In practice, the rate of movement of the filter assembly 201 is 300 to 500 feet per minute. The continuous filter assembly 201 forms a part of the degasser-filter apparatus 200 which also includes spaced transverse support bars 261 forming a part of vacuum table 260 which includes side walls 280, 282 between which the upper flight of filter assembly 201 moves. The bars 261 are of generally triangular cross-section with upper peaks as shown in FIG. 5B. The drilling mud which passes through the continuous filter assembly 201 also impinges on and passes through the bars 261 and falls into a chamber 262 which is defined in part by a pan 263.

Conduits 512 extend from conduit yokes 511 and 511a and are connected with openings in pan 263. Conduits 512 are consequently connected to vacuum pumps 502 and 503 so that chamber 262 is maintained at sub-atmosphere pressure. The reduced pressure in the chamber 262 assists in drawing drilling mud through the filter assembly 201, the drilling mud having been placed on filter assembly 201 in layered fashion by the drilling mud curtains 150–155. To assist in transferring the drilling mud through the filter assembly 201, a transverse row of nozzles 265 is provided between the curtains 151 and 152 and a similar row of nozzles 266 is provided between the curtains 154 and 153. These nozzles are supplied under pressure with "filtrate", that is, drilling mud which has been rejuvenated by having been passed through apparatus 10. These nozzles direct filtrate downwardly onto the layered drilling mud which has been deposited on the filter assembly 201, thereby tending to force drilling mud through the filter assembly 201. Additionally, solid particles which may be lodged on the filter assembly 201 are stripped of retained drilling fluids or "piggy-back" elements which are retained on the solids. The effect of the washing or impingement of the filtrate from the nozzles 265 and 266 is to provide for greater drilling mud recovery than would be possible if solid particles which are too large to pass through the filter assembly were permitted to be discarded without being washed or cleaned of these "piggy-back" drilling fluid elements carried on the surface of such solids.

The passage of the drilling mud through the filter assembly 201 occurs over the length of the chamber 262, and by the time a particular part of the filter assembly 201 approaches the left end of the pan 263 near the drum 300 substantially all of the drilling mud will have passed through filter assembly 201 into chamber 262. However, some filtrate will remain on and in the filter assembly 201.

The drilling mud as delivered from the distribution weir 120 will contain residual entrapped gas and/or air which will be dispersed therein as bubbles of varying sizes. The passage of the drilling mud through the filter assembly 201 will effect further partial degassing thereof of those bubbles of a larger size than the mesh of the screen 220. Thus, filter assembly 201 not only serves to separate the drilling mud from solid particles, but also serves as a first stage degasser of the drilling mud. A second stage degasser is provided by a pair of parallel rollers 250, 250a in the lower part of the chamber 262. Beneath the rollers 250, 250a there is a secondary pan portion 264 which includes a sump 270 at its lower end.

Above the portion of the chamber 262 which is nearest the drum 300, there is provided a transverse series of nozzles 267 (FIG. 5A) which serve to wash from the filter assembly 201 any filtrate remaining on it. Filtrate of drilling muds which are of the water base type are washed by discharge of small amounts of water from the nozzles 267, while filtrate of drilling muds which are of the oil base type are washed by discharge of diesel oil. This water or diesel oil wash, as the case may be, also serves to strip or remove "piggy-back" materials which may be on the solids carried by filter assembly 201 only a small portion of the wash fluids enters into the chamber 262 so that dilution of the drilling mud which is being rejuvenated is minimized. The washing fluid and any dissolved materials retained in the filter assembly 201 are removed from filter assembly 201 while it is passing around the extraction drum 300 by being sucked through the filter assembly 201 by suction apparatus including hoses 309 carried within the drum 300 as shown in FIG. 5A. The materials which are sucked through the filter assembly 201 into the drum 300 pass into separator means (described hereinafter) connected to a vacuum source to thereby effect recovery of the solids. Since these solids are principally the "piggy-back" barite particles there is thereby provided an apparatus for recovering the expensive barite material. Wash fluid may be recovered and reused, or discharged.

Large cutting particles riding on the upper surface of the upper flight of filter assembly 201 are discharged by centrifugal force when the filter 201 moves over the arcuate surface of drum 300 with such particles passing into the previously described solids removal system 550.

A filter assembly guide 202 is provided below the extraction drum 300 as shown in FIG. 5A, and has rollers 202a, about which passes the screens 220 and 222 of the filter assembly 201. As shown, the screens 220, 222 depart from the periphery of extraction drum 300 and proceed substantially vertically downwardly, whereas support belt 230 continues in engagement with the periphery of extraction drum 300, departing from it in a generally horizontal course. In this way, the screens 220, 222 will be seen to be separated from the support belt 230. The screens 220, 222 progress over additional guide rollers 203 (FIG. 5B) which are in fixed position, and then pass over pivotal guide 204, having rollers 204a. Guide 204 is pivoted on a shaft 205 which extends transversely of the path of filter assembly 201. A tension adjusting mechanism 206 is provided to effect rotation of guide 204 about pivot 205, to thereby adjust the tension on screens 220, 222.

Immediately after separating from the extraction drum 300, the screen 220 is subjected to backwashing by a row of water or diesel fuel nozzles 210 mounted on pipe 206' and high velocity air nozzle 207 which is supplied with pressurized air. Any solids adhering to the filter assembly are thus removed from the screen 220 and caused to fall into the solid removal system 550. Subsequent to its passage around the rollers 202a of guide 202, the screen 220 is subjected to a further backwash with water or diesel fuel by the discharge of a series of nozzles 208 on pipes 208a to remove any solids which may still remain on screen 220. The liquid from the nozzles 208, with any solids removed by the filtrate (which will be minimal), passes downwardly into a chamber 209; an ejector pump is provided in the chamber 209, including a pump nozzle 211 supplied with the same fluid as is sprayed from nozzles 208, and a discharge tube 212 which leads to storage means. As a consequence of cleaning the screen 220 by the air nozzle 207 and the wash from the nozzles 208 and the removal of materials by extraction drum 300 there is presented to the idler drum 400 a substantially clean screen assembly 201. The clean screen assembly is consequently in optimum condition for repetition of the process.

The weir rollers comprise larger diameter rollers 130 and smaller diameter rollers 131 as was noted previously. All of the weir rollers 130, 131 rotate in the same direction. The narrow spacing between adjacent rollers permits only a very small amount of drilling mud to pass through said space as exemplified by the thin curtain of flow at 156 in FIG. 7. It will be apparent that only very small particles included in the drilling mud may pass through adjacent rollers 130, whereas larger particles can pass between the small diameter weir rollers 131 and adjacent larger diameter weir rollers 130. This forms the curtains 150, 151, 152, 153, 154 and 155 of drilling mud. Substantially all of the drilling mud delivered to the distribution weir 120 will pass through it. Extending transversely beneath the rollers 130 and 131 is a spreader plate 147 of inverted V-shape which also functions as a brace and extends transversely of the rollers 130, 131, and serves to distribute drilling mud laterally. One or more of such spreaders 147 are placed so as to spread the drilling mud laterally after it passes through the weir rollers 130, 131.

The weir rollers 130 and 131 include an inner cylindrical metal core 136, and an outer sheath 137 of an elastomeric material such as teflon. As shown in FIG. 8, the core 136 and sheath 137 are connected by transverse pins 138. Keyways 139 are provided in the ends of the cores 136, and keys 140 connect these cores, and hence the rollers 130 and 131, to support shafts 141. As shown in FIG. 8, the right end of each support shaft 141 is journalled in a bearing 142 in side 122. The shaft 141 at the left end as shown in FIG. 8 is journalled in a bearing 143 in side 123, and has keyed to it a gear 144, in mesh with idler gear 145. A cover plate 146 covers the outer end of the gear box and provides bearing support for the outer end of shaft 141.

The shaft 134 (FIG. 6) drives one series of gears 144 and 145, and the shaft 134a drives another series of gears 144 and 145. The shaft 134 preferably is caused to rotate at a higher rate than the shaft 134a, so that a first, right hand (as viewed in FIG. 5B) group of weir rollers 130, 131 is driven at a higher speed than a second left hand group of weir rollers.

Nozzle rows 265 and 266 receive filtrate under pressure and spray it downwardly with substantial force against the upper surface of fine mesh screen 220. The support belt 230, rides on and engages a bars 261 of vacuum table 260. Bars 261 are separated by passages 261a through which drilling mud passes into chamber 262.

An overflow trough 160 (FIG. 10) is provided laterally adjacent the filter 201 for receiving drilling mud which may overflow the filter assembly 201. Trough 160 can be connected to a suitable pump for either recirculating any overflow to the drilling mud entry or for discharging it as may be necessary in the event there is a failure of any of the mechanical components of the mud rejuvenation system 10.

Conduits 512 which are connected with conduit yoke 511, which is connected to a vacuum pump, are provided on opposite ends with inlets to the chamber 262 beneath the bars 261. Also seen are conduits 512a which are connected with conduit yoke 511a and chamber 262. Conduit 512a is also connected to a vacuum pump. Thus, reduced pressure is provided within chamber 262 to assist in causing the drilling mud to pass through the filter assembly 201. Any air or gas which may be released during the passage of drilling mud in the chamber 262 is consequently quickly evacuated from the chamber.

The second stage degasser includes the parallel, powered rollers 250, 250a, which are rotated in opposite directions, as indicated by the arrows thereon. Rotation of the rollers 250, 250a, is effected by a motor-transmission drive apparatus generally designated 251, shown in FIG. 5A. Seals 252 are provided between the rollers 250, 250a and blocks 253, secured to the opposite walls of pan portion 264 to prevent passage of material around rollers 250, 250a. Beneath the space between rollers 250 and 250a there is provided an anvil plate 254, of a flat-inverted V-shape, to receive drilling mud projected there against by the rollers 250, 250a, thereby further assisting in separating air or gas from the drilling mud. Such air or gas is evacuated from a lower chamber 255, defined by the rollers 250, 250a, the blocks 253 and the pan portion 264 by conduit 256 connected through pressure reducing valve 257 to conduit 512.

The transverse sump pipe 270 at the lower end of the second stage degasser has an internal nozzle 271, supplied with pressurized filtrate from a pipe 272 connected to a pump or other source of pressurized filtrate. This forces the drilling mud which has completed its passage through the mud rejuvenation apparatus 10 through the filtrate pipe 13 back to the mud tank MT shown in FIG. 1. A lower flight of support belt 230 rides on a support plate 240 supported on frame members 20 and 21. Also, a guide roller 203 provides support for the screen assembly 201.

Figure 11:
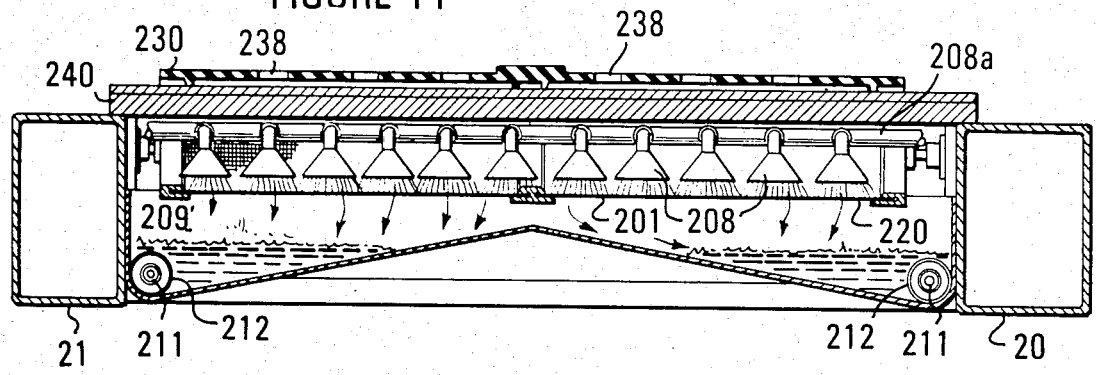
FIG. 11 is a cross-sectional view taken on line 11—11 of FIG. 5A.

FIGS. 5A and 11 illustrate an open-topped chamber housing 209, between the frame members 20 and 21 with screen filter assembly 201 being above the chamber, and nozzles 208 supported by and receiving filtrate under pressure from a pipe 208a so as to direct filtrate onto and through the assembly 201 into chamber 209' of housing 209. The chamber 209' has two spaced nozzles which discharge filtrate into a discharge tube 212 connected to filtrate pipe 13.

Figure 12:
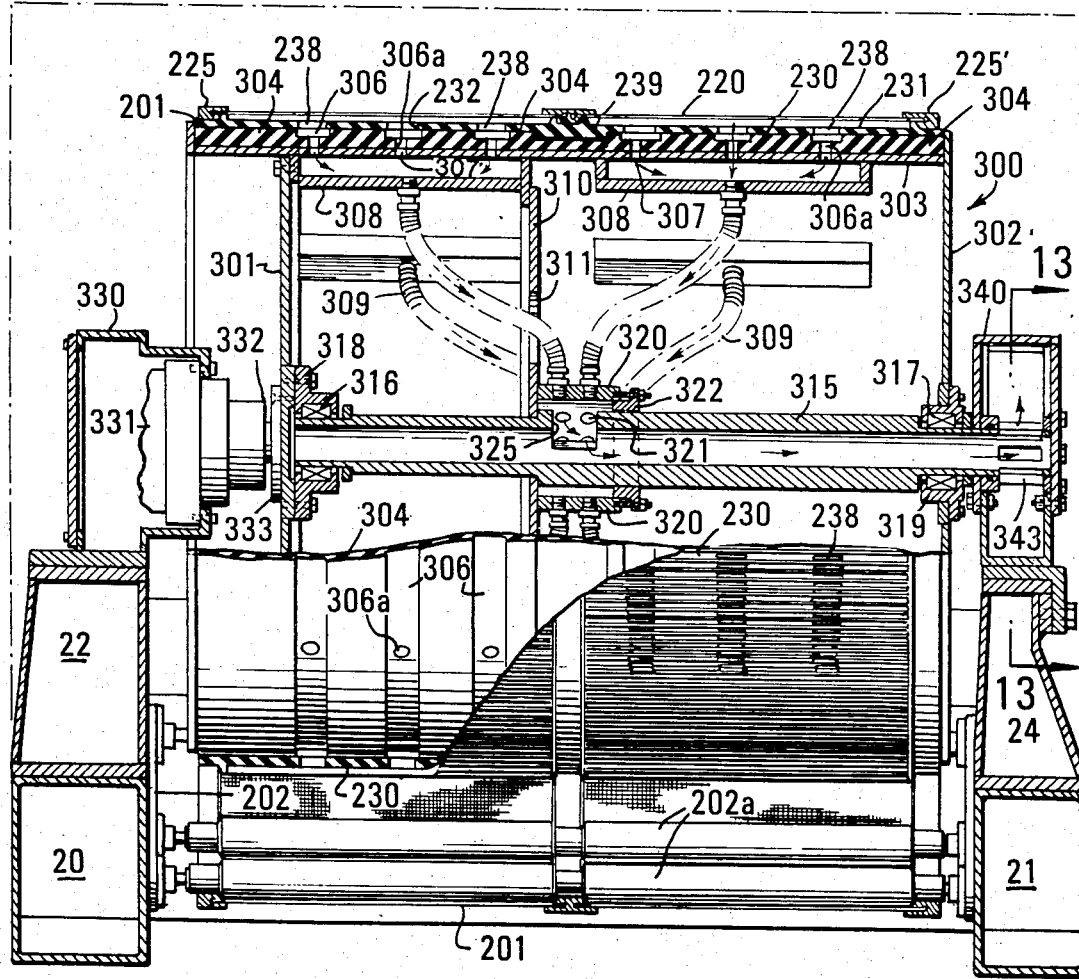
FIG. 12 is a cross-sectional view taken on line 12—12 of FIG. 5A.
Figure 22:
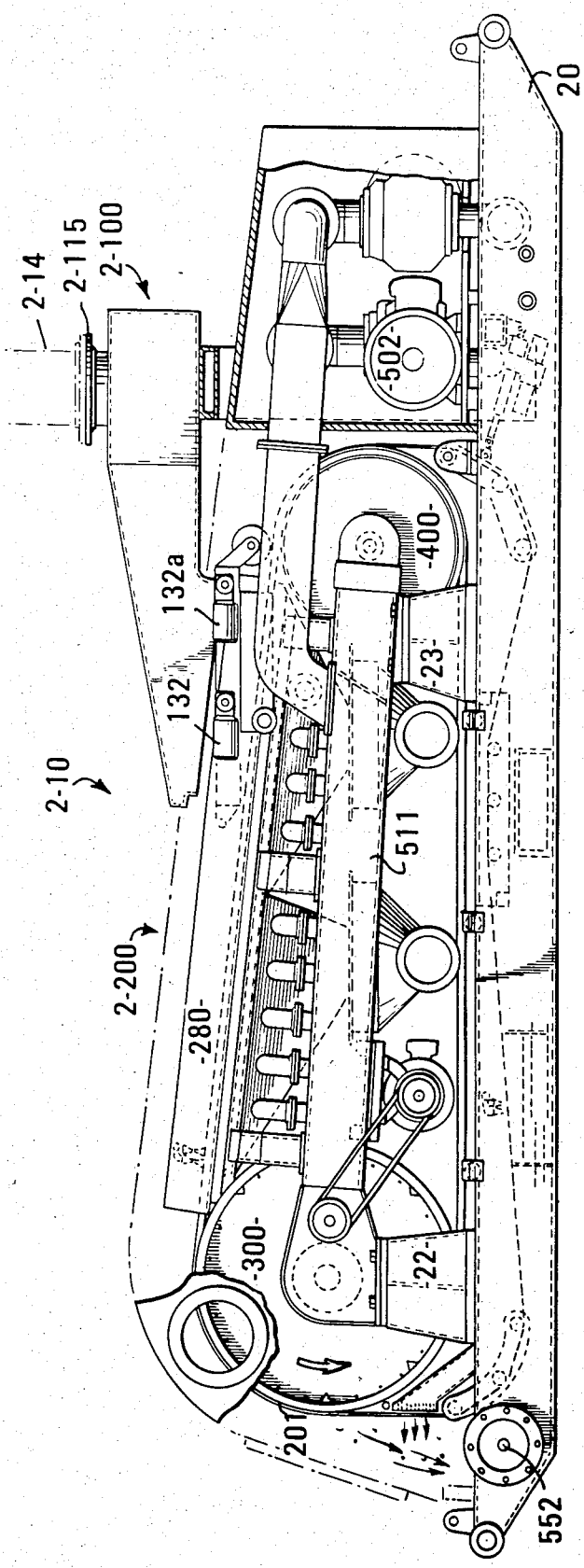
FIG. 22 is a side elevation of an alternate embodiment of the mud rejuvenation system in accordance with the present invention.
Figure 23:
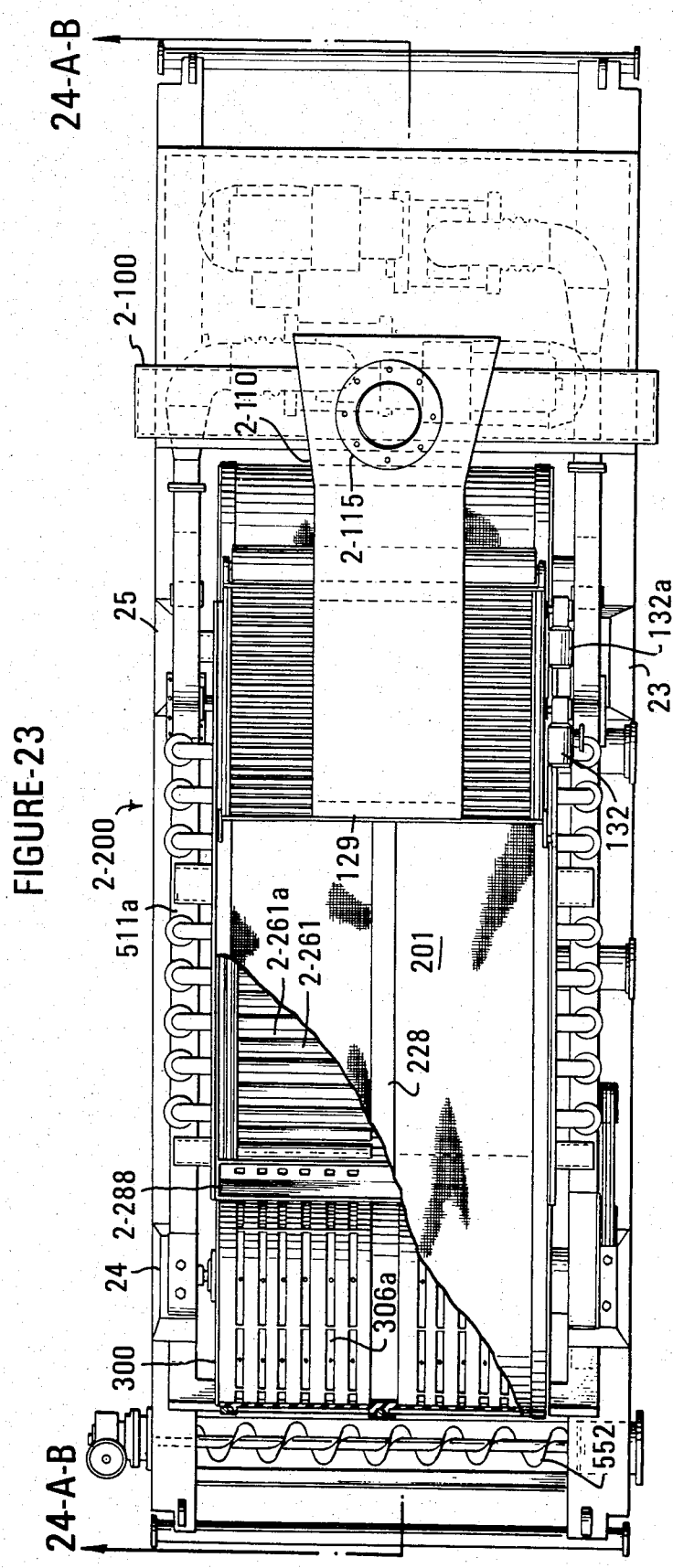
FIG. 23 is a plan view of the embodiment of FIG. 22 with parts removed.

The extraction drum 300 and its mounting are shown in FIGS. 5A, 12, 13 and 14, to which reference is made. Extraction drum 300, as shown in FIG. 12, includes a pair of side walls 301 and 302 which support a cylinder 303 having on its outer face an elastomeric cylinder facing layer 304. Support belt 230 rides on layer 304 and is pierced by a plurality of openings 238. The openings 238 register with corresponding arcuate peripherial grooves 306 in layer 304. Radial openings 306a connect grooves 306 with radial openings 307 in cylinder 303. A plurality of axially extending suction nozzles 308 are secured to the inner surface of the cylinder 303 with each nozzle spanning a plurality of the openings 307. A suction hose 309 is connected to each of the suction nozzles 308. There is also provided an intermediate wall 310 in the evacuation drum 300 which include suitable openings 311 for passage therethrough of some of the suction hoses 309 as shown in FIG. 12.

The extraction drum 300 is supported for rotation on a stationary, hollow shaft 315 journalled thereon by means of bearings 316 and 317 as illustrated in FIG. 12. A housing 318 engages the bearing 316, and is bolted to the side wall 301. A housing 319 engages the bearing 317 and is bolted to the side wall 302 of drum 300. A sleeve 320 (see also FIG. 14) mounted on intermediate wall 310 has peripheral openings 321 to which the suction hoses 309 extend, to thereby communicate the interior of sleeve 320 with the suction hoses 309. The sleeve 320 is secured, as by welding, to wall 310, and coaxially encircles shaft 315 in spaced relation to it. A seal 322 is attached to sleeve 320, as by screws, and sealingly engages the outer surface of the shaft 315. Shaft 315 has an opening 325 communicating with sleeve 320, and between wall 310 and seal 322 so as to provide continuous fluid communication between the interior of shaft 315 and the space within sleeve 320, there being provided, as shown in FIG. 5A and FIG. 14, sealing baffles 326 and 327. The sealing baffles 326 and 327 (see FIG. 5A) provide a circumferentially extending chamber 328, defined by a part of the interior wall of sleeve 320, by the interior surfaces of wall 310 and by seal 322. Thus, referring to FIG. 5A, as the extraction drum 300 rotates, and a suction hose 309 approaches the vertical, its inner end passes the baffle 326, and it is thereby in communication with the interior of shaft 315, which is connected to vacuum, and remains in communication with the interior of shaft 315 until it passes below the horizontal position, and passes beyond chamber 328, as defined by the sealing baffle 327. Thus extraction is effected through a limited zone of rotation of extraction drum 300, so as to draw through filter assembly 201 material deposited on it by the wash nozzle 267 as well as any other residual material of sufficiently small size as to permit passage through the openings in fine mesh screen 220.

Drive to the extraction drum 300 is provided within the housing 330 supported on the pillar 22 by a transmission 331 having an output shaft 332, connected to a flange 333 which is, in turn, connected to the drum side wall 301. This structure supports the end of the stationary shaft 315, bearing 316 permitting drum 300 to rotate, and transmission 331 effecting the rotation. A motor 332 is connected by a transmission belt 334 to a pulley 335 connected with the transmission 331 as shown in FIG. 3.

A hollow housing 340 is provided on pillar 24 and as shown in FIGS. 13 and 14, has a slot 341 therein, which receives a generally U-shaped yoke 342. Welded in the yoke is a support sleeve 343 having openings 344 therein. Keys 345 are provided, extending in sleeve 343, and in the end of shaft 315. The end of shaft 315 which is received in the support sleeve 343 is provided with openings 329 which may be seen in FIG. 13 to communicate with the openings 344 in support sleeve 343. Thus, these openings provide for communication of the interior of the housing 340 with the interior of shaft 315. Housing 340, as shown in FIG. 14, has a baffle 359 isolating its interior from the interior of conduit yoke 511a; however, an outlet 360 in the housing provides connection to a source of vacuum to be described.

In FIG. 15, there is shown the conduit yoke 511a with a branch 514 extending upwardly, above an inclined plate 515 which seals off the end portion of the conduit yoke 511a. There is thereby provided a chamber 516 in which is provided an adjustable tension effecting device 410. The chamber 516 is bounded by an end plate 517 having an aperture 518 therein, and a pair of guide rods 519 and 521 extending perpendicularly thereto. A linearly movable shaft support 420 is provided for supporting one end of the shaft 401 of idler drum 400, and includes a pair or bearing supports 421 having bearings 422 therein, which receive the guide rods 519 and 521. Shaft 401 is carried in a sleeve 432 which is connected to the side walls 433 and 434 of carrier 420 as best shown in FIG. 17.

An axially movable rod 411 of the tension device 410, as shown in FIG. 17, is connected to a pillar 412 in shaft support 420 by a bolt 413, thereby effecting sliding of the shaft support 420 and shaft 401 horizontally under the urging of the tension effecting device 410, which serves to provide the proper tension on the filter 201. The opposite end of shaft 401 is supported for adjustment by identical means including a shaft support 420' and tension device 410' (FIG. 3).

The tension devices 410, 410' may be of any known construction, keeping the filter assembly 201 under suitable tension during its operation and permitting sufficient slack to permit removal of the assembly 201 and belt 230 if required.

Referring to FIG. 18, there is shown the fine mesh screen 220 forming a part of the filter assembly 201 which is divided into first and second panels 201A and 201B by an intermediate support strip 228. As was noted previously, the filter assembly comprises outer fine mesh screen 220 and inner course support screen 222. Fine mesh screen 220 is "187 mesh" screen when drilling mud weighted with barite is used, and "325 mesh" screen when unweighted drilling mud is used. The bottom support screen 222 is 18 mesh stainless steel, and functions to give mechanical strength to the screen 223. Side edging strips 225, 225' are provided, each having a slit 226 therein, and an enlarged bore 226a in which glue is provided to hold the edges of the screens 220 and 222.

The edging strips 225, 225' are also provided with inclined inwardly facing surfaces 227. Intermediate support strip 228 is provided, separating the panels 201A and 201B, and is similar in construction to edging strips 225, having inclined surfaces 229a and 229b.

Support belt 230 has side edge protrusions 231 and 231a inwardly of the outer edges, thereby providing flanges 232 and 232a as illustrated in FIG. 18. The protrusion 231 has a mating surface 233 which is engaged by the surface 227 of edging strip 225 and there is similar engagement of the protrusion 231a with the other edging strip 225. The belt 230 also has intermediate protrusions 234 and 234a (FIG. 19), which extend longitudinally the entire length of belt 230 as do the protrusions 231 and 231a. The protrusions 234 and 234a are provided with surfaces 235a and 235b which are engaged by the surfaces 229a and 229b of the intermediate strip 228. By the system of protrusions and surfaces herein above discussed, a secure guiding and supporting of the screen 220 by support belt 230 is achieved.

Additionally, the belt 230, as shown in FIG. 21, has a plurality of upstanding ridges 236, extending laterally across belt 230, the ridges 236 extending above the body 237 of belt 230. The ridges form a very large number of transverse cells or troughs to receive drilling mud therein. The cells are provided with multiple openings 238 extending through the body 237 of support belt 230, so as to enable the high volume of drilling mud which is deposited on belt 230 to pass through it at great speed. This is important in removing from the belt 230 substantially all of the drilling mud deposited on it during a very short length of travel. For added strength, the belt 230 has a downwardly extending central guide rib 239 which mates in a peripherally extending groove 305 in the extraction drum 300, as shown in FIG. 4.

Referring to FIGS. 22-30, there is disclosed a second embodiment of the mud rejuvenation system in accordance with the present invention, and which is generally designated 2-10. In the description of the second embodiment, reference numerals of parts which are different from parts and constructions of the first embodiment are designated with the prefix "2". The pretreatment apparatus 2-100 includes, as shown in FIG. 24b, an entry weir housing 2-110 having an upwardly extending flanged entry pipe 2-115, there being provided an entry weir wall 2-116 having an upper weir lip 2-112. The lip 2-112 is spaced below the top wall 2-117 of the weir 2-110, thereby providing a passage above the lip 2-112 through which drilling mud received from the mud pipe 2-14 is delivered. Thus, the chamber provided in part by the weir wall 2-116 is a holding chamber which receives and accommodates any surging of the drilling mud.

Figure 24A:
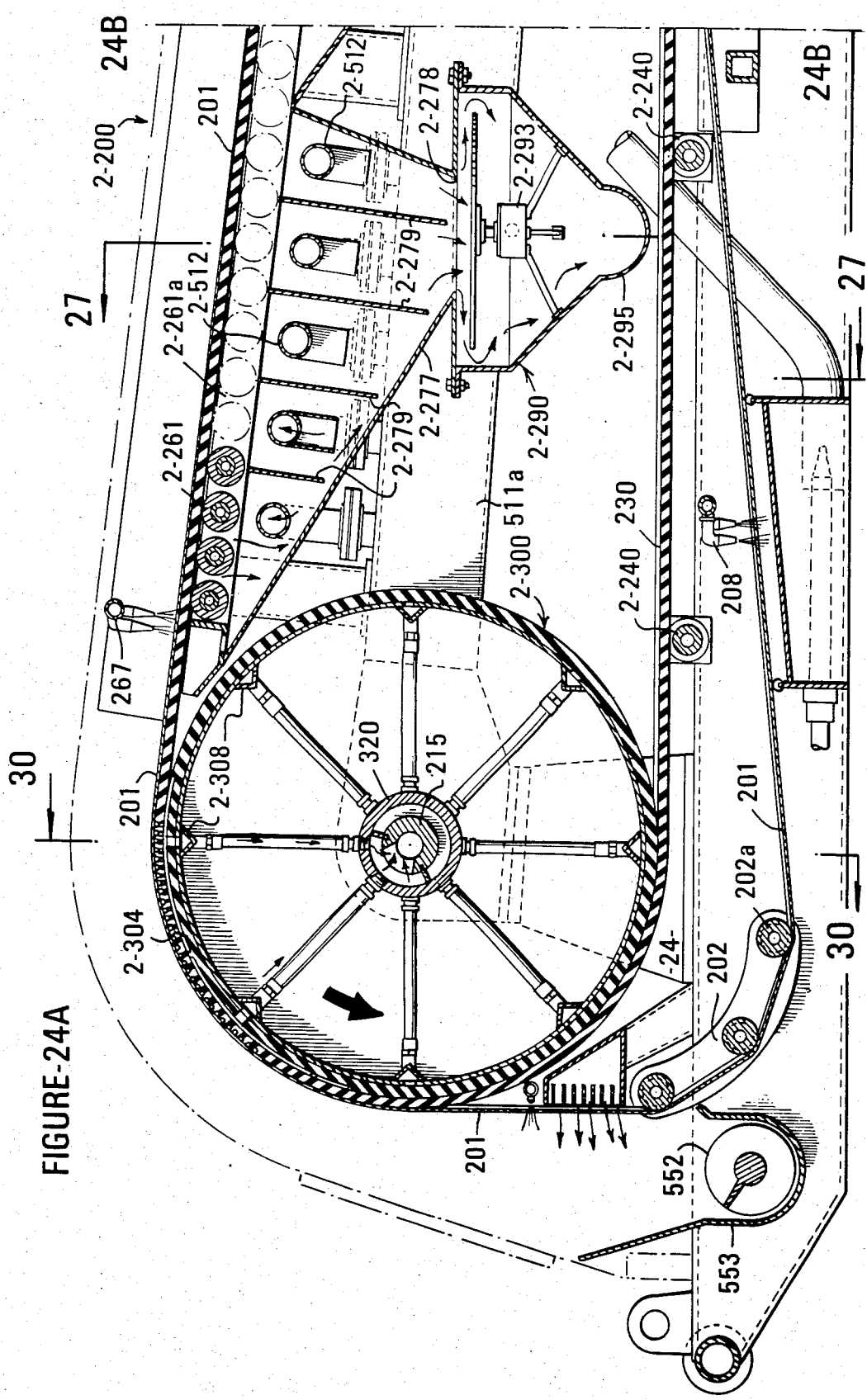
FIG. 24A-B is a cross-sectional view taken on line 24-A-B of FIG. 23.
Figure 24B:
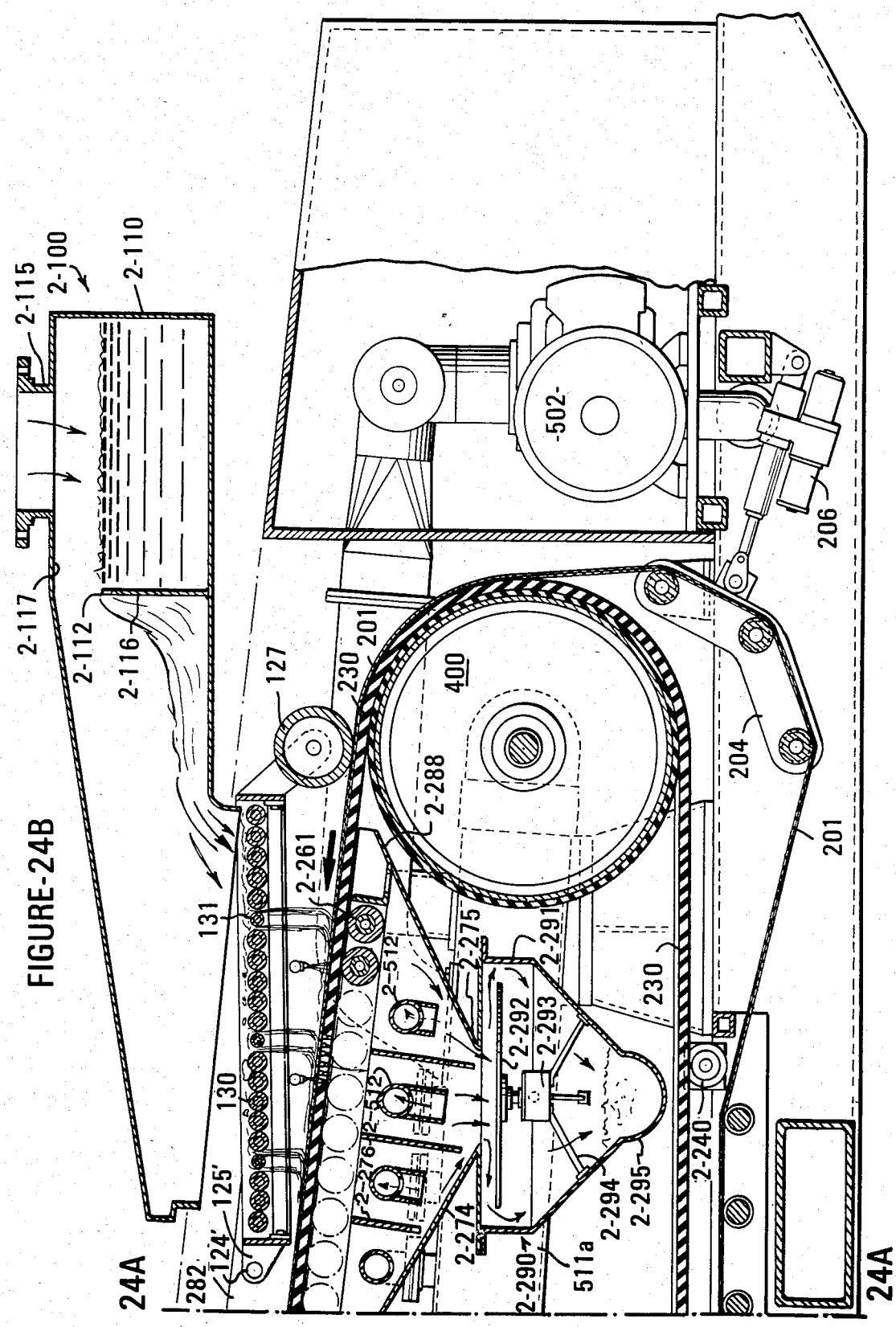

The degasser-filter apparatus 2-200 (see FIG. 23) includes a vacuum table 2-260 provided with spaced parallel rollers 2-261 having spaces 2-261a between them. The rollers 2-261 support the continuous filter assembly 201 and support belt 230 with the spaces 2-261a enabling drilling mud which has passed through elements 201 and 230 to move into pans 2-274 and 2-277 beneath rollers 2-261. As shown in FIGS. 24A and 24B, the rollers 2-261 extend along and beneath the path of the upper flight of the filter assembly 201 and support it for low friction movement so as to reduce abrasion of and drag on the filter assembly 201. Also, referring to FIGS. 24A and 24B, the belt 230, at its lower run, is supported by a series of rollers 2-240, to lessen wear and friction.

The vacuum table 2-260 is illustrated in FIG. 25 and includes the spaced rollers 2-261 which have large diameter end portions 2-281, with a central shaft 2-282, shown exposed at the center of the rollers 2-261. The enlarged portions 2-281 are provided by elastomeric sleeves formed of teflon, rubber or the like, and the shaft 2-282, as shown in FIG. 26 is hollow. The inward end spacing of the elastomeric sleeves provides a space for receiving the guide rib 239 of support belt 230 (FIG. 19). A bearing 2-283 is provided in the end of each of the hollow shafts 2-282 as shown in FIG. 26. The outer face of the bearing is engaged with the interior surface of shaft 2-282 and a stub shaft 2-284 extends from the inner face and has a coating 2-284a thereon. A nut 2-285 is threaded on the end of the stub shaft 2-284.

A support rail 2-286 extends longitudinally on each side of the table 2-260, with a block 2-286a mounted on it and secured to it be cap screws 2-286b. Welded to the support rail 2-286 is a plate 2-287 having downwardly directed slots 2-287a at regularly spaced intervals therealong. The slots 2-287a are sized to receive and hold the nuts 2-285, as shown in FIG. 25. Inwardly of the plate 2-287 is a spacer plate 2-289 which is provided with holes at regular intervals, for receiving the bolt 2-284 and the coating 2-284a thereon.

With the foregoing construction, the support rail 2-286 and blocks 2-286a are provided in laterally spaced, parallel arrangement and are connected by transverse members 2-288. The rollers 2-261 are assembled, with the shaft 2-284 passed through the openings in the plates 2-289. This holds them in assembled relationship, and the assembly of the rollers 2-262 and the two plates 2-289 is then placed in position, with the nuts 2-285 entering into slots 2-287a and the plate 2-287, thereby completing the assemblage of the vacuum table 2-260.

Figure 27:
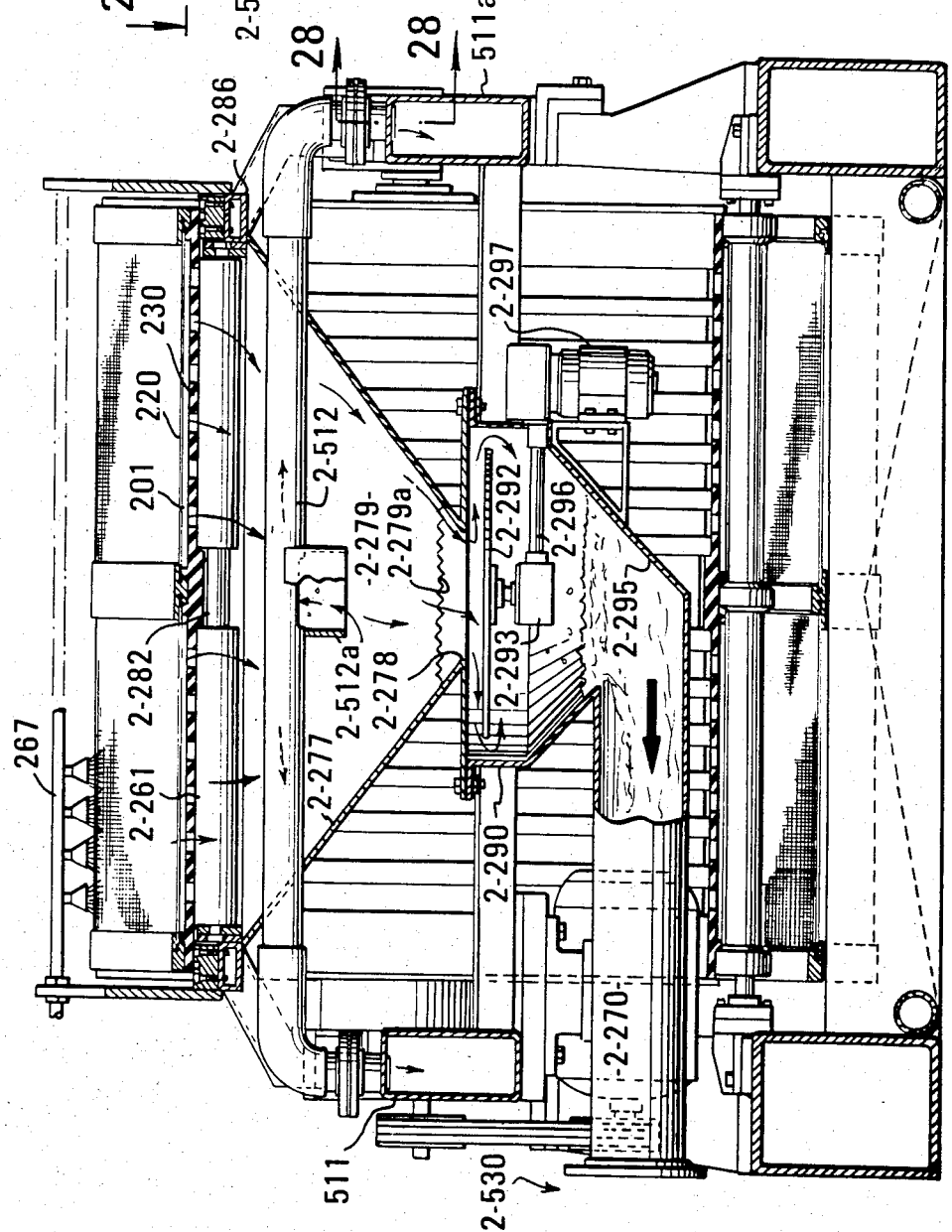
FIG. 27 is a cross-sectional view taken on line 27—27 of FIG. 24A.

Pan 2-274 has a bottom outlet 2-275 though which drilling mud is discharged and has vertically extending therein divider plates 2-276, dividing the chamber within the pan 2-274 into four sub-chambers. An exhaust conduit 2-512 enters each of the sub-chambers, and is structurally connected with conduit-yokes 511 and 511a at opposite ends as shown in FIG. 27. Each conduit 2-512 has a downwardly facing central opening over which a tubular shroud 2-512a is fitted.

A second pan 2-277 similarly is provided with an outlet 2-278 at its lower portion and similarly provides a chamber which is sub-divided by divider plates 2-279. Thus, the chamber provided in part by the pan 2-277 is sub-divided by five of the divider plates 2-279, and exhaust conduits 2-512 connects each of the sub-compartments with the conduit-yokes 511 and 511a.

A second stage degasser apparatus 2-290 is positioned below each of outlets 2-275 and 2-278. The second stage degasser 2-290 are of substantially identical construction and each include a housing 2-291 having a rotating disk 2-292 therein. The disks are driven by a gear box 2-293 supported by struts 2-294. The housing 2-291 is partly cylindrical, its walls being cylindrical outwardly of the disk 2-292, and then being downwardly conical, leading to a sump 2-295. The drilling mud strikes the rotating disk 2-292 relatively close to its center, where the impact liberates small bubbles of gas. The drilling mud is layered, as a thin sheet on the rotating disk 2-292 which fact assists in releasing gas. Moreover, the drilling mud is thrown by centrifugal force against the walls of housing 2-291, where the impact facilitates the liberation of such further entrained gas as may remain in the drilling mud at this stage.

Turning now to FIG. 27, there is shown the filter assembly 201 including fine screen 220 and belt 230, supported by rollers 2-261. A divider plate 2-279 is shown, having a lower edge 2-279a. Beneath the outlet 2-278 is the rotating disk 2-292 and gear box 2-293 which is driven by shaft 2-296 from motor drive unit 2-297. In the chamber provided by the pan 2-277, four of the conduits 2-512 will be seen to include a centrally positioned suction shroud 2-512a, the conduits 2-512 being in communication with both conduit yoke 511 and conduit yoke 511a. The second stage degasser 2-290 is in communication with the pans 2-274 and 2-277 through the outlet 2-278 since drilling mud will not entirely fill the opening 2-278 at all times and will not provide a seal between the chamber defined by the pans and the second stage degassers 2-290. If there should be a significant build-up of gaseous pressure within the second stage degassers 2-290 from gas separated from the drilling mud by the impingement of the drilling mud as it is propelled under centrifugal force from the rotating disk 2-292 against the cylindrical wall of second stage degasser 2-290, it may escape as a large bubble through the drilling mud through the opening 2-278, or a conduit may be provided connecting the second stage degasser 2-290 to one or both of the conduit yokes 511, 511a, similar to the conduit 256 of the first embodiment.

The sump 2-295 in which the degassed drilling mud collects is connected with an outlet pipe 2-270 which forms part of the filtrate removal system 2-530; as will be understood, there will be a pipe 2-270 from each of the second stage degassers 2-290, and these pipes will be joined for delivery of the rejuvenated drilling mud to the mud tank. The flow through the pipes of the filtrate removal system 2-530 is preferable by gravity; however, filtrate jets can be optionally employed.

Figure 28:
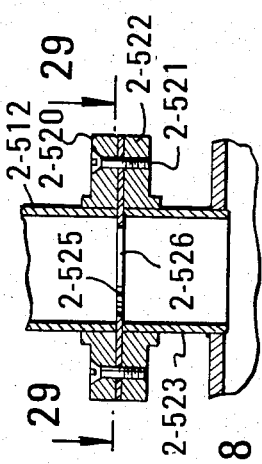
FIG. 28 is a cross-sectional view taken on line 28—28 of FIG. 27.
Figure 29:
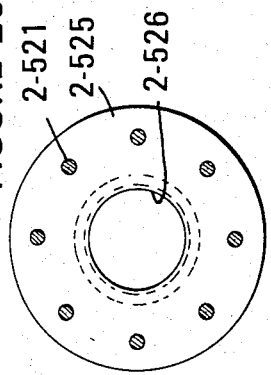
FIG. 29 is a cross-sectional view taken on line 29—29 of FIG. 28.

Referring to FIGS. 28 and 29, there is shown the end of a typical suction conduit 2-512, joined to a flange 2-520 that is connected by bolts or screws 2-521 with a second flange 2-522. Flange 2-522 is connected with a short pipe 2-523, which is in fluid communication with the conduit yoke 511a. Between the flanges 2-520 and 2-522 there is an orifice plate 2-525 having an orifice 2-526, which defines the cross-sectional area of the flow passage. The orifice plate 2-525 and the orifice 2-526 is selected to establish the flow area in a particular conduit 2-512, and by utilizing orifice plates 2-525 having different sizes of orifices 2-526 in each of the conduits 2-512, there may be established the desired flow rate through each of the conduits 2-512. A similar arrangement is provided at the other end of conduit 2-512 where it is connected to conduit yoke 511.

FIG. 30 illustrates extraction drum 2-300 which has side walls 2-301 and 2-302 and an intermediate wall 2-310 which is penetrated at its outer periphery by suction troughs 2-308a to each of which is connected a suction hose member 2-309. Similarly, suction troughs 2-308b do not penetrate wall 2-310 and are connected to hose member 2-309b. Thus, the suction hoses are straighter than in the embodiment shown in FIG. 8 they do not penetrate the intermediate wall 2-310 as in the first embodiment.

The belt 2-230 of filter assembly 201 differs from belt 230 in that there are provided six openings 2-232 in each side of the belt 2-230, and the facing layer 2-304 of extraction drum 2-300 has corresponding radial openings 2-306, connected with peripherally extending arcuate grooves 2-306a. Each suction trough 2-308, as shown in FIG. 24A, is of generally triangular cross-section.

Figure 33:
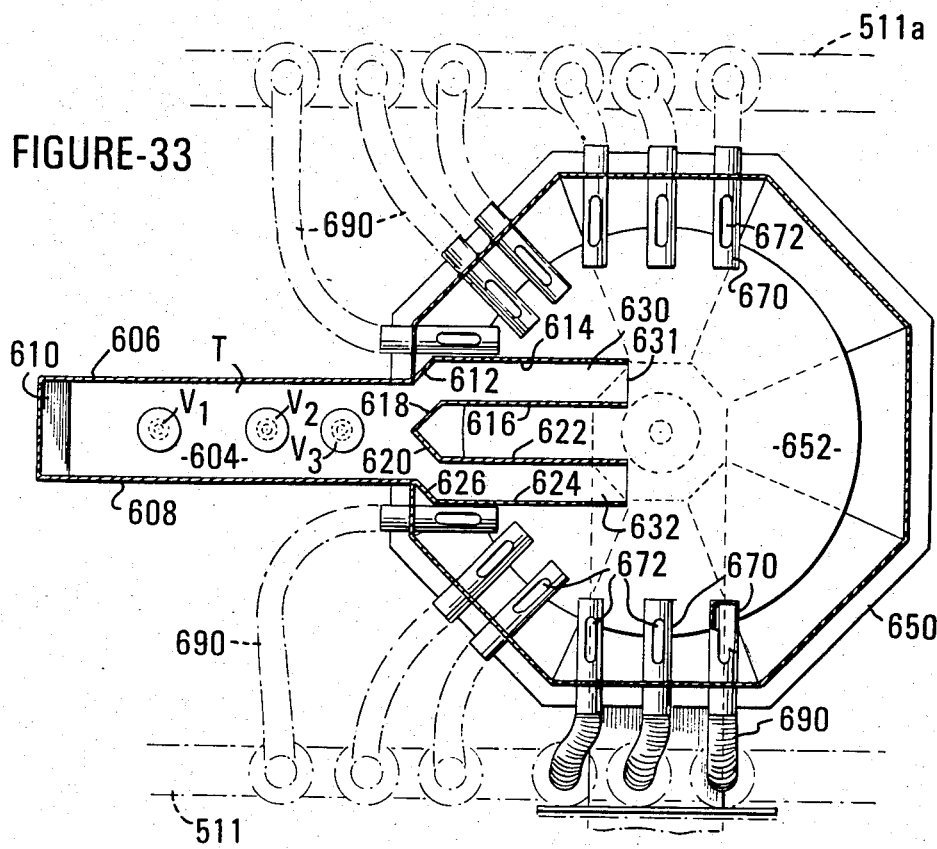
FIG. 33 is a top plan view of the embodiment of FIG. 32.
Figure 34:
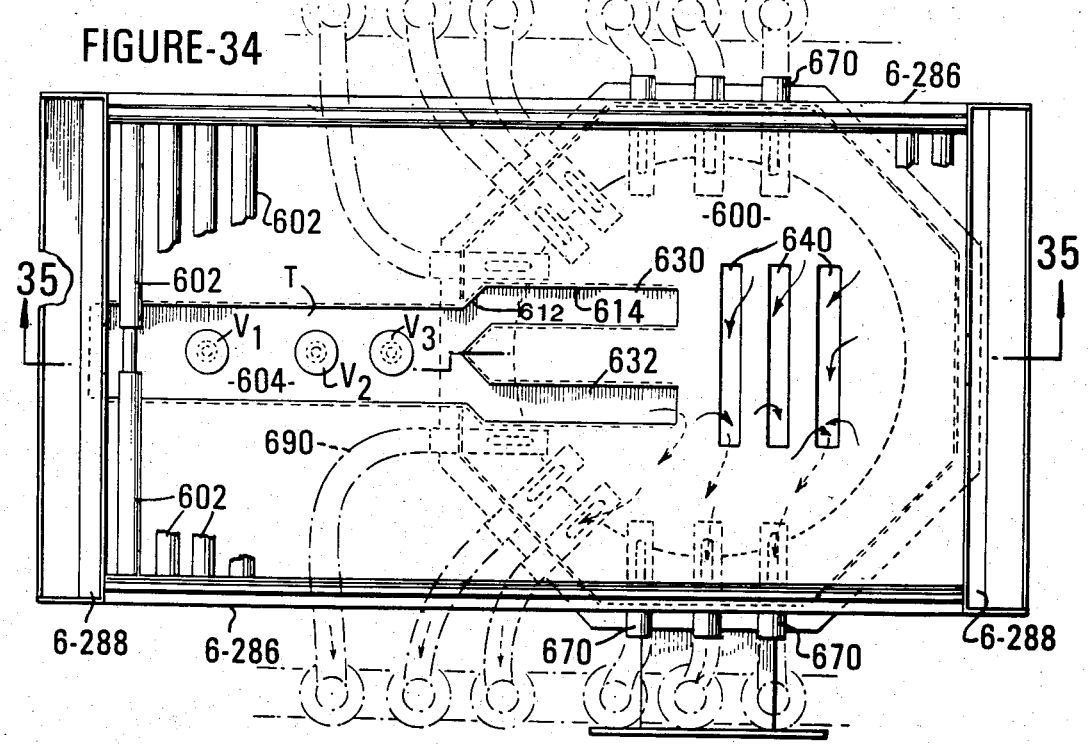
FIG. 34 is a sectional view taken on line 34—34 of FIG. 32.

Attention is invited to FIGS. 32 through 36 which illustrate a third embodiment of the invention in which a relatively large single spinning disk degasser is employed. In this embodiment the vacuum table is defined by a trough plate 600 extending beneath all of the rollers 602 which provide support for the moving flight of the filter assembly 201. In fact, the embodiments of FIGS. 32 etc. is identical to the embodiment of FIGS. 22 etc. in all details with the exception of the mud receiving degassing means positioned beneath the rollers 602. The boundaries of trough plate 600 comprise side frame members 6-286 along the sides of the vacuum table and end frame members 6-288 as illustrated in FIGS. 35 and 36. A downwardly extending trough T extends from the left end of trough plate 600 and is defined by a bottom wall 604 of Y-shaped configuration as shown in FIG. 34; the periphery of the Y-shaped trough is defined by first and second side walls 606 and 608, a canted end wall 610 and wall elements 612, 614, 616, 618, 620, 622, 624 and 626. It will be observed that wall elements 612, 614, 616, and 618 define a first discharge trough 630 having an outlet edge 631 whereas wall elements 620, 622, 624 and 626 define a second discharge trough 632 having an outlet edge 633. Adjustable valve means V1, V2 and V3 are provided in bottom wall 604 as shown in FIG. 33 and FIG. 35. Additionally, trough plate 600 is provided with three transverse discharge slots 640.

A degasser housing 650 of octagonal peripheral configuration is viewed from above as shown in FIG. 33 is attached to the trough plate 600 and encloses a large degasser spinning disk 652 mounted on a shaft 655 inside an enclosure 654 with the lower end of the shaft being driven by motor transmission means 660 through a belt 662 in a manner that will be obvious from inspection of FIG. 36.

Suction pipes 670 having inlet openings 672 extend into the interior of housing 650 in a manner best shown in FIGS. 33 and 36 and are connected on their outer ends by hose type connectors 690 to either conduit yoke 511 or conduit yoke 511a as shown in FIG. 33. Consequently, the interior of the degasser housing 650 is at a reduced pressure as is the space above trough plate 600 by virtue of the fact of the communication between the space above trough plate 600 and the interior of the degasser housing 650 provided by slots 640 and the openings at trough edges 631, 633. The valves V1, V2 and V3 can be adjusted to permit venting of atmospheric air into the left hand portions of the trough T to reduce the vacuum beneath the downstream rollers 602 (those rollers to the left as view in FIG. 35) if desired. It should be observed that in most instances the drilling mud will have passed through the filter belt assembly before it reaches the left hand rollers and there will consequently be little need for applying substantial vacuum to that portion of the belt flight.

The operation of the embodiment of FIGS. 32 etc. is basically the same as the operation of the second embodiment. More specifically, mud passes through the filter assembly, down onto the trough plate 600 from which it flows into the discharge slots 640 or into the trough beginning at the left end of the trough plate 600 from which it then flows downwardly through discharge troughs 630, 632 over edges 631, 633 onto the top of spinning disk 652. It should be observed that the valve members V1 etc. can be constructed so as to preclude the outflow of mud through said valves while still permitting the inward flow of venting air if needed. The mud from troughs 630, 632 and slots 640 strikes the disk 652 to result in some degassification and is hurled outwardly against the peripheral wall 653 to result in further and greater degassification of the mud which then flows down the sloping side walls of the degasser housing 650 for discharge outwardly through a conduit 695 to be conveyed preferably by gravity to the mud tank MT. If necessary, a filtrate jet can be provided in conduit 695 or elsewhere to effect the necessary pumping of the mud to the mud tank.

FIG. 31 illustrates a cyclone separator 700 connected to conduit 351 for receiving the materials sucked through the evacuation drum 300. These materials include barite and possibly some other materials which are substantial economic value. A conduit 720 connects the cyclone separator 700 to a second separator 740 which is connected by conduit 750 to a source of vacuum. Conduit 750 can, for example, be connected to any of the vacuumized degasser housings such as housing 650. In some circumstances, it would be possible to bypass the cyclone separator and/or separator 740 and simply connect conduit 351 back into the degasser.

While numerous modifications of the disclosed embodiments of the invention will undoubtedly occur to those of skill in the art, it should be understood that the spirit and scope of the invention is to be limited solely by the appended claims.

Thus, it will be seen that the present invention in all of its embodiment provides great economies over all previous known mud treatment systems and also provides superior results as compared to previous systems. For example, economy is achieved by virtue of the fact that the present invention completely eliminates the need for power consuming centrifugal pumps of the type used in conventional systems. The power requirements of the present invention are substantially less than those of present known mud treatment systems. Additionally, further benefits are derived by the elimination of centrifugal or other mechanical pumps involved in the pumping of mud containing cuttings. This feature of the present invention avoids the chopping up of the cuttings into small particles which are difficult or impossible to remove from the mud. It also avoids the expense of wear and tear on pumps resultant from the pumping of mud containing cuttings. In fact, use of the present system requires only one mechanical pump and that is for pumping the rejuvenated mud down the well. Since the rejuvenated mud does not contain cuttings, there is no adverse effect on the pump.

Further benefits of the present invention are resultant from the fact that the mud is totally cleaned for each circulation of the mud through the system. The operation is continuous during the entire drilling of a well so as to permit a substantial time and cost savings in the drilling operation for completion of the well. Another significant aspect of the invention resides in the fact that the speed of movement of the filter assembly is of significant importance in that increased speed of the assembly results in a reduction in the size of particles which will pass through the filter assembly. Consequently, in some operations it would be possible to vary the filter belt speed in order to precisely control the mud condition. Higher filter belt speeds give more pounds flow per minute while reducing the particle size passable through the screens.

Another significant difference of the present invention over the prior known devices is that the product of value in the present invention goes through the screen whereas in other screening operations the product of value is retained on the top of the screen. Thus, the operation is exactly the reverse of previous know filter systems.

Further, the present invention represents a substantial departure from prior know mud treatment systems in that it completely rejuvenates the mud back to its original condition. No such rejuvenation is possible with conventional systems and it is consequently necessary in many instances to attempt to manipulate the mud by adding further additive and the like in an effort to maintain minimum satisfactory mud conditions necessary for completing the well.

We claim:

1. A method for rejuvenating drilling mud received from a well comprising the steps of:
   (a) providing an endless filter having an upper surface and a lower surface,
   (b) causing said endless filter to move along a predetermined path of travel,
   (c) delivering a mixture of drilling mud including cuttings solids to the upper surface of said endless filter, and
   (d) applying suction to the lower surface of said filter and drawing substantially all of the drilling mud through the filter and leaving said cuttings solids on the upper surface of said endless filter to provide rejuvenated mud beneath said filter.

2. The method of claim 1 wherein said mixture of drilling mud and cuttings is delivered to said endless filter in the form of downwardly moving thin curtains spaced along and extending across the path of travel of said endless filter.

3. The method of claim 2 wherein said suction is applied to the lower surface of said filter in the area beneath the filter portion on which said mixture is delivered to the upper surface of said endless filter.

4. The method of claim 3 including the step of degassing drilling mud subsequent to its passage through said endless filter.

5. A method of separating drilling mud from earth cuttings comprising the steps of:
   feeding a mixture of drilling mud and earth cuttings onto a surface of a filter belt portion moving along a path of movement;
   creating a pressure differential across said filter belt portion drawing substantially all of said drilling mud through said filter belt portion and leaving the earth cuttings on the filter belt portion to separate the drilling mud from the cuttings.

6. The method of claim 5 wherein said mixture is delivered to said surface of said filter belt portion by a plurality of downwardly moving, relatively thin, spaced flow curtains positioned substantially transverse to the direction of movement of said filter belt.

7. The method of claim 5 wherein said pressure differential is effected in the area of said filter belt portion onto which said mixture is fed.

8. The method of claim 7 wherein said mixture is delivered to said surface of said filter belt by a plurality of downwardly moving, relatively thin, spaced flow curtains positioned substantially transverse to the direction of movement of said filter belt.

9. Apparatus for rejuvenating drilling mud received from a well comprising:
   (a) filter means including an endless movable filter means mounted for movement along a path of movement having a primarily horizontal direction component;
   (b) drive means for moving said filter means along said path of movement;
   (c) infeed means for depositing a mixture of cuttings and drilling mud on said filter means, said infeed means for depositing said mixture of cuttings and mud on said filter means including means for depositing said mixture of drilling mud and cuttings on said filter means at spaced locations along the path of movement of said filter means and in alignment with said hereinafter recited suction means, said means for depositing said mixture on said filter means at spaced locations along the path of movement of said filter means including a plurality of weir rollers extending horizontally transversely above said path of movement of said filter means and means for depositing said mixture on upper portions of said weir rollers, the axes of said weir rollers being uniformly spaced and at least one of said weir rollers being of lesser diameter than a weir roller adjacent to said one weir roller so as to provide relatively larger spacing between said one weir roller and the adjacent weir roller than the space between adjacent ones of other weir rollers, said larger spacing defining a down-flow opening through which said mixture flows in curtain-like manner onto said filter means;
   (d) suction means for drawing substantially all of said drilling mud from said mixture through said filter means to separate said drilling mud from said cuttings to provide rejuvenated mud;
   (e) receiving means for receiving said rejuvenated mud drawn through said filter means; and
   (f) delivery means for delivering rejuvenated mud from said receiving means to means for permitting reuse of said rejuvenated mud.

10. The apparatus of claim 9 further including roller drive means for rotating said weir rollers in the same direction.

11. The apparatus of claim 10 wherein said roller drive means includes weir roller shafts and gears on said shafts.

12. The apparatus of claim 11 wherein said roller drive means includes means for rotating a first group of weir rollers at a first speed and means for rotating a second group of weir rollers at a second speed.

13. Apparatus for rejuvenating drilling mud received from a well comprising:
   (a) filter means including an endless movable filter means mounted for movement along a path of movement having a primarily horizontal direction component;
   (b) drive means for moving said filter means along said path of movement;
   (c) infeed means for depositing a mixture of cuttings and drilling mud on said filter means;
   (d) suction means for drawing substantially all of said drilling mud from said mixture through said filter means to separate said drilling mud from said cuttings to provide rejuvenated mud;
   (e) receiving means for receiving said rejuvenated mud drawn through said filter means;
   (f) delivery means for delivering rejuvenated mud from said receiving means to means for permitting reuse of said rejuvenated mud; and (g) wherein said infeed means for depositing said mixture of cuttings and drilling mud includes distribution weir means, means feeding said mixture of drilling mud and cuttings onto said distribution weir means, said distribution weir means including a group of parallel, spaced weir rollers each arranged in adjacent relationship to at least one other weir roller, each of said weir rollers being substantially transverse to and above the path of movement of said filter means and extending in side-by-side manner along and above said filter means so that said mixture of drilling mud and cuttings passes downwardly in the form of a thin curtain along a vertical flow path between selected weir rollers onto said filter means.

14. The apparatus of claim 13 wherein the spacing between some of said adjacent weir rollers is greater than the spacing between others of said adjacent weir rollers so as to provide a space defining said vertical flow path.

15. The apparatus of claim 14 wherein said weir rollers have their axes uniformly spaced and at least one of said weir rollers has a different diameter than others of said weir rollers.

16. The apparatus of claim 14 further including roller drive means for rotating said weir rollers so that their upper surfaces move in the same direction that said filter means moves along said path of movement when said filter drive means is operated.

17. Apparatus for rejuvenating drilling mud received from a well comprising:
(a) filter means including an endless movable filter means mounted for movement along a path of movement having a primarily horizontal direction component;
(b) drive means for moving said filter means along said path of movement;
(c) infeed means for depositing a mixture of cuttings and drilling mud on said filter means;
(d) suction means for drawing substantially all of said drilling mud from said mixture through said filter means to separate said drilling mud from said cuttings to provide rejuvenated mud;
(e) receiving means for receiving said rejuvenated mud drawn through said filter means;
(f) delivery means for delivering rejuvenated mud from said receiving means to means for permitting reuse of said rejuvenated mud; and
(g) wherein said infeed means includes means for delivering said mixture to said filter means at spaced relatively narrow down-flow locations along the path of movement of said filter means including a plurality of horizontal weir rollers extending transversely above said path of movement of said filter means and means for depositing said mixture on upper portions of said weir rollers, the axes of said weir rollers being spaced and parallel and at least two of said weir rollers being spaced from adjacent weir rollers to provide a larger spacing between said two weir rollers and their adjacent weir rollers than the space between adjacent ones of other weir rollers, said larger spacings defining down-flow openings contiguous with said down-flow locations through which said mixture flows in thin curtain-like manner onto said filter means, roller drive means for rotating said weir rollers so that their upper surfaces move in the same direction that said filter means moves along said path of movement when said filter drive means is operated, said receiving means including vacuum table means positioned beneath the path of movement of said endless moving filter and the portion of the filter means on which the mixture is deposited, said vacuum table means including support roller means for supporting said horizontally extending upper flight for permitting the passage of mud through the horizontally extending upper flight, and said vacuum table having an outlet in the bottom thereof, degasser means comprising degasser housing means enclosing a disk positioned below said outlet for receiving mud therefrom, means for supporting said disk for rotation in a substantially horizontal plane, drive means for rotating said disk, wall means in spaced surrounding relationship to said disk for receiving drilling mud centrifugally slung from said disk against said wall means and means for receiving drilling mud flowing from said wall means, said filter means comprising a filter assembly in the form of a closed filter belt loop and a closed rubber-like support belt loop underlying said closed filter belt loop a pair of spaced drums supporting said closed support belt loop and said closed filter belt loop so that said closed belt loops have a generally horizontally extending upper flight extending between said drums and defining said path of movement wherein said vacuum table means and said degasser housing are positioned within the confines of said support belt loop.

18. The apparatus of claim 17 wherein said filter belt loop is of approximately 187 mesh construction.

19. Apparatus for rejuvenating drilling mud received from a well comprising:
(a) filter means for filtering mud including an endless movable filter belt having a belt portion mounted for movement along a path of movement having a substantially horizontal direction component with said filter belt portion having an upper surface and a lower surface as it moves along said path of movement;
(b) drive means for moving said filter belt portion along said path of movement;
(c) infeed means for depositing a mixture of cuttings and drilling mud on said upper surface of said filter belt portion;
(d) means for creating a pressure drop across said filter belt portion on which said mixture is deposited from said upper surface to said lower surface to cause said drilling mud to flow through said filter belt portion through said lower surface to separate said drilling mud from said cuttings to provide rejuvenated drilling mud beneath said filter belt portion;
(e) receiving means for receiving said rejuvenated mud drawn through said filter means;
(f) delivery means for delivering rejuvenated mud from said receiving means to means for permitting reuse of said rejuvenated mud; and
(g) wherein said infeed means for depositing said mixture of cuttings and drilling mud on said upper surface of said filter belt portion includes means for delivering said mixture of drilling mud and cuttings to said upper surface of said filter belt portion at spaced locations along the path of movement of said filter belt portion.

* * * * *